(12) United States Patent
Uthaman et al.

(10) Patent No.: US 11,281,804 B1
(45) Date of Patent: Mar. 22, 2022

(54) PROTECTING DATA INTEGRITY IN A CONTENT DISTRIBUTION NETWORK

(71) Applicant: Amazon Technologies, Inc., Seattle, WA (US)

(72) Inventors: Karthik Uthaman, Seattle, WA (US); Ronil Sudhir Mokashi, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 266 days.

(21) Appl. No.: 16/368,705

(22) Filed: Mar. 28, 2019

(51) Int. Cl.
*G06F 21/64* (2013.01)
*H04L 29/06* (2006.01)

(52) U.S. Cl.
CPC ............ *G06F 21/64* (2013.01); *H04L 63/123* (2013.01)

(58) Field of Classification Search
CPC . H04L 63/123; H04L 2463/145; H04L 63/10; H04L 67/2842; H04L 67/2847; H04L 67/2852; H04L 67/2857; H04L 9/3236; G06F 21/64
USPC ..... 726/2–3, 26–29; 713/150–153; 711/2, 3, 711/117–122, 216
See application file for complete search history.

(56) References Cited

U.S. PATENT DOCUMENTS

| | | | | |
|---|---|---|---|---|
| 7,073,055 B1 * | 7/2006 | Freed | ................... | H04L 63/0823 713/155 |
| 7,584,285 B2 * | 9/2009 | Hudson | ............... | H04L 67/1044 709/228 |
| 8,230,087 B2 | 7/2012 | Alve | | |
| 8,341,242 B2 | 12/2012 | Dillon et al. | | |
| 8,484,511 B2 * | 7/2013 | Tidwell | ................ | H04N 21/458 714/15 |
| 8,516,529 B2 | 8/2013 | Lajoie et al. | | |
| 8,578,166 B2 | 11/2013 | De Monseignat et al. | | |
| 8,935,315 B2 | 1/2015 | Hudson et al. | | |
| 9,342,661 B2 | 5/2016 | Cholas et al. | | |
| 9,537,650 B2 | 1/2017 | Auradkar et al. | | |
| 9,681,161 B2 | 6/2017 | Gonder et al. | | |
| 9,817,952 B2 | 11/2017 | Cholas et al. | | |
| 10,263,997 B2 * | 4/2019 | Roth | ..................... | H04L 63/123 |
| 2003/0126276 A1 * | 7/2003 | Kime | ................ | H04N 21/64715 709/231 |
| 2003/0149581 A1 | 8/2003 | Chaudhri et al. | | |

(Continued)

*Primary Examiner* — Saleh Najjar
*Assistant Examiner* — Khalid M Almaghayreh
(74) *Attorney, Agent, or Firm* — Robert C. Kowert; Kowert, Hood, Munyon, Rankin & Goetzel, P.C.

(57) ABSTRACT

Various embodiments of apparatuses and methods for protecting data integrity in a content distribution network ("CDN") are described. Code or data in one of the servers or instances of a CDN might sometimes become incorrect or corrupt. One corrupted server or instance can potentially impact a considerable portion of the CDN. To solve these and other problems, various embodiments of a CDN can designate one or more parameters, which are then identified in a request for content to another entity. In these embodiments, the CDN can generate an encoding of the expected values of the designated parameters. The CDN can then compare, in these embodiments, its encoding of the expected values to an encoding of the values received from the other entity in response to the request. The CDN can validate the content of the response, as well as the identity of the other entity, in some embodiments.

22 Claims, 10 Drawing Sheets

(56) References Cited

U.S. PATENT DOCUMENTS

| | | | |
|---|---|---|---|
| 2013/0159472 A1* | 6/2013 | Newton | H04L 41/0856 |
| | | | 709/219 |
| 2015/0271179 A1* | 9/2015 | Wang | G06F 21/105 |
| | | | 726/30 |
| 2017/0163683 A1* | 6/2017 | van den Berghe | H04L 65/607 |
| 2017/0244682 A1* | 8/2017 | Chen | H04L 67/26 |
| 2018/0213053 A1* | 7/2018 | Yeager | H04L 67/1014 |
| 2018/0219871 A1* | 8/2018 | Amin | H04L 67/327 |
| 2019/0158481 A1* | 5/2019 | Ronda | H04L 63/08 |
| 2021/0019359 A1* | 1/2021 | Newton | G06F 16/9574 |

* cited by examiner

PROTECTING DATA INTEGRITY IN A CONTENT DISTRIBUTION NETWORK

BACKGROUND

The ubiquity of high-speed Internet access has paved the way for alternatives to traditional broadcast media (e.g., "over-the-air" broadcast, wired cable television, and satellite broadcast). For instance, to augment or replace broadcast media, consumers can rent, purchase, and/or subscribe to electronic content delivered over the Internet. As conventional broadcast media has generally employed mature technologies capable of providing seamless playback of content, consumers have grown to expect a high level of quality from the content viewing experience. From the content consumer's standpoint, the fact that streaming media is a relatively new technology in comparison to conventional broadcast media is no excuse for poor playback performance, such as playback interruption, rebuffering, and/or video quality degradation.

Networks for delivering streaming content to users over the Internet can be large, complex, and capital intensive to deploy and maintain. In some cases, merchants that offer electronic content over the Internet will enlist the services of a third party network provider. For instance, the merchant may have the proper rights or licenses to sell or rent content while opting to offload the actual content delivery to a third party. These third parties often include content delivery network (or content distribution network) ("CDN") providers. In these types of arrangements, the merchant may handle the business logic for selling or renting content to a customer while the CDN provider handles the delivery of streaming content to the customer's playback device.

Content delivery networks sometimes use cache to deliver the content at faster speeds and/or with less latency. For example, to minimize the distance between the clients and a server with the original content, a CDN can store a cached version of the original content in multiple geographical locations (a.k.a., points of presence, or "PoPs"). Each PoP can contain a number of caching servers responsible for content delivery to clients within its proximity. However, content delivery networks can be susceptible to cache poisoning. Cache poisoning can occur, for example, when incorrect data or code from a cache of one server or instance in the CDN somehow infects or gets copied to other servers or instances in the content delivery network. CDNs can be susceptible to cache poisoning even if, for example, a single server or instance is deployed with or acquires bad data or code. Consider a case where a single instance running bad code starts fetching content for an incoming request from an origin that's not associated with the same customer. One corrupted server could possibly impact a considerable portion of the entire CDN's cache. Techniques to prevent such a corruption of code or data in CDNs are needed.

Figure 1:
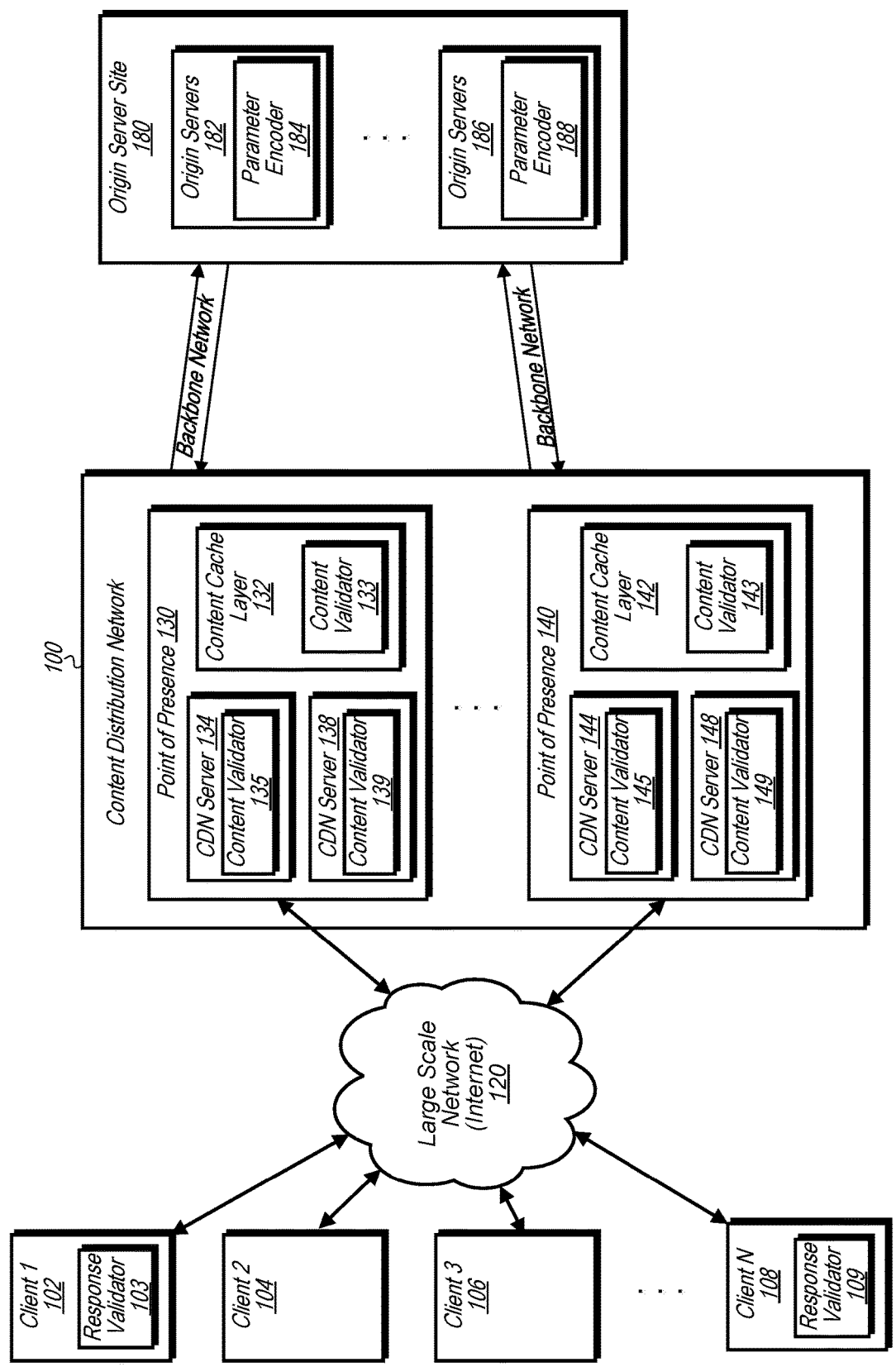
FIG. 1 illustrates a system that comprises a content distribution network communicating with a plurality of clients and an origin server site, where the CDN has a plurality of points of presence, each point of presence with a plurality of CDN servers and a content cache layer, where each of the CDN servers and content cache layer has a content validation component, according to some embodiments.

In the following sections, reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments of apparatuses and methods for protecting data integrity in a content distribution network ("CDN") are described. Sometimes in a CDN, code or data in one of the servers or instances might become incorrect or corrupt. This might be due to benign sources, such as incorrect software or corrupted data or a problem with the cache layer, or more malicious sources, such as a man-in-the-middle attack between the CDN and the origin. As an example, data might be retrieved from an incorrect origin. There are many other scenarios where incorrect content might be delivered to a client. This incorrect code or data does not simply affect only one request, but since many traditional CDNs cache all the content, the cache becomes corrupted or "poisoned" and any future request for the data, or an object containing the data, will use or return the incorrect content. Since traditional CDNs do not perform any data validation to ensure that data retrieved is actually correct data from a specific origin, incorrect content might be provided to a customer without the knowledge of the CDN, in these circumstances. Even if the communication to the origin is later repaired, such that, for example, the correct origin is being communicated with, the content is still incorrect or corrupted since the content is cached. After a repair is made, the entire cache then has to be cleared in order for the issue to go away completely.

More specifically, CDNs can have a multi-layered cache hierarchy. For example, CDNs can have at least two levels of cache, a L1 (for example, a hot cache) and an L2 (for example, a cache-width). Some CDNs also implement a third layer of cache, which acts as mid-tier cache between multiple points of presence ("PoPs") in a particular region, and the server with the original content, (a.k.a. an origin server). This mid-tier cache layer can help reduce the load from the origin for the PoPs in a particular region. However, because of this many to one design, even if a single host in a mid-tier cache goes bad, it can affect the cache or data on a large number of PoPs. Therefore, one corrupted server could possibly impact a considerable portion of cache mainly due to the multi-layered cache hierarchy of CDNs. Since traditional CDNs don't have any form of validation on the content fetched from an origin, all the caching layers downstream will store and serve the incorrect content until the incorrect content either expires or is invalidated. More specifically, when a traditional CDN forwards a request from one layer to another, it blindly trusts that what an upstream layer sends as a response is the right response, and it caches the response without any form of verification.

There are many different ways that a traditional CDN can cache and return an incorrect response for a request from a client. From the time a request is received in a first cache layer, for example L1, to the time another cache layer fetches a response to the request from the origin, the requests go through a series of modifications in each cache layer. Due to this dynamic nature of this request processing, an incorrect action can easily be performed by a CDN, or incorrect data can be accessed, which could go unnoticed until a customer complains. For example, a traditional CDN server or instance might pull a response from a different origin that's not associated with the particular client. As another example, a traditional CRN might unintentionally modify Uniform Resource Identifier ("URI"), such as a Uniform Resource Locator ("URL"), in a layer of the CDN that faces the origin. As another example, a CDN might serve an incorrect range. A client, for example, might request the first 100 bytes of an object, but the CDN system might return the last 100 bytes of an object. This can be due to, for example, a bug in the code or a network transmission issue. As a further example, a CDN might apply an incorrect method. For example, a customer might send a request to get an object, but the CDN might apply a delete method on the object, or might send a delete request to the origin, causing the object to be deleted from the data store. The CDN would incorrectly be causing the object to be deleted from the data store.

Some embodiments of the current invention attempt to solve at least some of these problems through various types of data verification and/or validation procedures. Some embodiments of the current invention attempt to validate the content that is received from the origin. This can be done, for example, to ensure that the correct origin is being communicated with. Some embodiments of the current invention validate the method being applied so that an incorrect method is not executed or sent to the origin. By employing these validation mechanisms between cache layers, these embodiments are avoiding incorrect items from being cached or served in the first place. As explained herein, there are many other different types of ways in which embodiments of the current invention can improve traditional systems.

The security protocols of traditional communication systems are not specifically tailored for the issues of CDNs or similar systems and/or do not solve for any of the previously described problems, as well as other problems not previously described, that can be inherent to a CDN or a similar type system. For example, Transport Layer Security ("TLS") provides a handshake mechanism that allows for authentication of one or both of the parties to a network communication. However, these types of traditional systems do not provide any verification and/or validation mechanism for the data being requested. For example, TLS will not verify if any data that is received is actually from a part of a file that was requested, and not from a different part of the same or different file that was not requested. As another example, TLS will not verify that the method applied is the same method that was requested.

In some embodiments of the current invention, a requesting layer will require a validation signature and/or hash to be received from its upstream layer for at least some requests. In some of these embodiments, the responding layer does not just send a response, but also sends the properties that were used to create the response. This can be in the form of a metadata to the response, in some embodiments. These properties can be compared by the requesting layer to the properties which the requesting layer expected would be used to create the response, in order to determine if the properties match, in some embodiments.

In the simplest embodiments, there are simply two layers communicating with each other, the CDN and the origin. In these embodiments, the CDN then makes a request to the origin in such a way to ensure that the response from the origin is the correct response to the request that was sent to the origin. In some of these embodiments, the CDN includes a header to the request. This header informs the origin to use one or more specified properties of the request, in order to create a signature out of the specified properties. Some of these properties which the requesting layer might inform the upstream layer to use are the URL and the method of the request and/or the range the request. The requesting layer might inform the upstream layer to use any other property of the request which it deems important or which the requesting layer wishes to include.

After the origin receives the request, in these embodiments, the origin retrieves the data from, for example, its storage devices, and then sends a response back to the requesting layer. When sending the response, the origin will extract the values for the properties which the requesting layer specified, and create, in some embodiments, an MD5 hash of the values. In other embodiments the origin will create a different kind of hash, or a different kind of signature using some or all of these values. The origin will send the MD5 hash value back to the requesting layer. As an example, if the requesting layer informed the origin to use are the URL of the request, the method of the request, and the range the request, then the origin will extract the URL that it is serving, the method that it received, and the range of the content that it is returning, and return an MD5 hash of these values back to the requesting layer. The requesting layer will itself also create a similar hash on its end using the requested values. The requesting layer will compare the hash received from the origin with the hash that it computed. If the hash values match, then the CDN knows that the origin sent the correct data. If the hashes do not match, then the data might be discarded, and an error response returned to the customer, in some embodiments. In other embodiments, the data might be further used by the CDN, but the data might comprise or be associated with an indication that the data was not properly verified or validated.

Instead of simply returning a hash value, the origin can also, in some embodiments, encrypt the hash before it is returned to the requesting layer. The hash can be encrypted, for example, to prevent certain kinds of attacks, such as a man-in-the middle attack between the CDN and the origin. The CDN then receives the encrypted hash from the origin. At some point either before or after the CDN receives the encrypted hash, the CDN will itself also create a similar hash on its end using the request properties. The CDN will, in these embodiments, decrypt the encrypted hash from the origin, and then compare the hash received from the origin with the hash that it computed. If the hash values match, then the CDN knows that the origin sent the correct data. If the hashes do not match, then the data might be discarded, and an error response returned to the customer, in some embodiments. In other embodiments, the data might be further used by the CDN, but the data might comprise or be associated with an indication that the data was not properly verified or validated.

This concept used in the embodiments which involve only a CDN and an origin communicating with each other, can be extended to include a CDN that has multiple cache layers, in other embodiments. In these other embodiments, a requesting cache layer makes a request to an upstream cache layer in such a way to ensure that the response from the upstream cache layer is the correct response to the request that was sent to the upstream cache layer. In some of these embodiments, the requesting cache layer includes a header to the request. This header informs the upstream cache layer to use one or more specified properties of the request, in order to create a hash and/or signature out of the specified properties. Some of these properties which the requesting layer might inform the upstream layer to use are the URL and the method of the request and/or the range the request. The requesting cache layer might inform the upstream cache layer to use any other property of the request which it deems important or which the requesting cache layer wishes to include.

After the upstream cache layer receives the request, in these embodiments, the upstream cache layer retrieves the data from, for example, further upstream layers such as the origin, and then sends a response back to the requesting cache layer. When sending the response, the upstream cache layer will extract the values for the properties which the requesting cache layer specified, and create, in some embodiments, an MD5 hash of the values. In other embodiments the upstream cache layer will create a different kind of hash, or a different kind of signature using some or all of these values. The upstream cache layer will send the hash and/or signature, such as the MD5 hash value, back to the requesting cache layer. As an example, if the requesting cache layer informed the upstream cache layer to use are the URL of the request, the method of the request, and the range the request, then the upstream cache layer will extract the URL that it is serving, the method that it received, and the range of the content that it is returning, and return an MD5 hash of these values back to the requesting cache layer. The requesting cache layer will itself also create a similar hash on its end using the requested values. The requesting layer will compare the hash received from the upstream cache layer with the hash that it computed. If the hash values match, then the requesting cache layer knows that the upstream cache layer sent the correct data. If the hashes do not match, then the data might be discarded, and an error response returned to the requestor, such as the customer, in some embodiments. In other embodiments, the data might be further used by the requesting cache layer, but the data might comprise or be associated with an indication that the data was not properly verified or validated.

Instead of simply returning a hash value, the upstream cache layer can also, in some embodiments, encrypt the hash before it is returned to the requesting cache layer. The hash can be encrypted, for example, to prevent certain kinds of attacks, such as a man-in-the middle attack between the requesting cache layer and the upstream cache layer. The requesting cache layer then receives the encrypted hash from the upstream cache layer. At some point either before or after the requesting cache layer receives the encrypted hash, the requesting cache layer will itself also create a similar hash on its end using the request properties. The requesting cache layer will, in these embodiments, decrypt the encrypted hash from the upstream cache layer, and then compare the hash received from the upstream cache layer with the hash that it computed. If the hash values match, then the requesting cache layer knows that the upstream cache layer sent the correct data. If the hashes do not match, then the data might be discarded, and an error response returned to the requestor, such as the customer, in some embodiments. In other embodiments, the data might be further used by the requesting cache layer, but the data might comprise or be associated with an indication that the data was not properly verified or validated.

These various types of data verification and/or validation can be extended end-to-end, in some embodiments, to include both the origin and the requesting client or customer in order to provide more complete protection. The procedures outlined above can be extended to the communication between the client or customer and the most downstream layer of the CDN. This most downstream layer could be, for example, an L1 cache layer. The client or customer can make a request to the CDN layer closest to the client or customer in such a way to ensure that the response from this CDN layer is the correct response to the request that was sent to this CDN layer. In some of these embodiments, the client or customer includes a header to the request. This header informs the CDN layer closest to the client or customer to use one or more specified properties of the request, in order to create a hash and/or signature out of the specified properties. Some of these properties which the client or customer might inform this CDN layer to use are the URL and the method of the request and/or the range the request. The client or customer might inform this CDN layer to use any other property of the request which it deems important or which the client or customer wishes to include.

After the CDN layer closest to the client or customer receives the request, in these embodiments, this CDN layer retrieves the data from, for example, further upstream layers such as the origin, and then sends a response back to the client or customer. When sending the response, this CDN layer will extract the values for the properties which the client or customer specified, and create, in some embodiments, an MD5 hash of the values. In other embodiments this CDN layer will create a different kind of hash, or a different kind of signature using some or all of these values. The CDN layer closest to the client or customer will send the hash and/or signature, such as the MD5 hash value, back to the client or customer. As an example, if the client or customer informed this CDN layer to use are the URL of the request, the method of the request, and the range the request, then this CDN layer will extract the URL that it is serving, the method that it received, and the range of the content that it is returning, and return an MD5 hash of these values back to the client or customer. The client or customer will itself also create a similar hash on its end using the requested values. The client or customer will compare the hash received from this CDN layer with the hash that it computed. If the hash values match, then the client or customer knows that the CDN layer closest to the client or customer sent the correct data. If the hashes do not match, then the data might be discarded, and another request generated, in some embodiments. In other embodiments, the data might be further used by client or customer, but the data might comprise or be associated with an indication that the data was not properly verified or validated.

Instead of simply returning a hash value, the CDN layer closest to the client or customer can also, in some embodiments, encrypt the hash before it is returned to the client or customer. The hash can be encrypted, for example, to prevent certain kinds of attacks, such as a man-in-the middle attack between the client or customer and the CDN layer closest to the client or customer. The client or customer then receives the encrypted hash from this CDN layer. At some point either before or after the client or customer receives the encrypted hash, the client or customer will itself also create a similar hash on its end using the request properties. The client or customer will, in these embodiments, decrypt the encrypted hash from this CDN layer, and then compare the hash received from the upstream cache layer with the hash that it computed. If the hash values match, then the client or customer knows that this CDN layer sent the correct data. If the hashes do not match, then the data might be discarded, and another request generated, in some embodiments. In other embodiments, the data might be further used by the client or customer, but the data might comprise or be associated with an indication that the data was not properly verified or validated.

In some embodiments that include multiple cache layers, one or more of the cache layers will require a validation signature to be received from its upstream cache layer for at least some requests. In these embodiments, a requesting cache layer will send a header to its upstream cache layer, providing information about various keys to use in generating this signature. The corresponding upstream layer might also then, in turn, forward the request upstream. Once a response to the request is formulated or retrieved, the corresponding upstream layer then uses the data for the response, along with the keys, to compute an encrypted MD5 hash, for example, and attach it to the response. On receiving the response from the corresponding upstream layer, the requesting layer would also compute the same MD5 hash using the keys from its forwarded request properties, and compare it with the decrypted MD5 hash received from upstream layer. If the MD5 hashes match, the content is then cached. Otherwise, the requesting layer discards the content and serves an error, such as a 500 internal server error, in some embodiments. In other embodiments, the data might be further used by the requesting cache layer, but the data might comprise or be associated with an indication that the data was not properly verified or validated. For example, the requesting cache layer might use the data to respond to a request from a downstream layer, but might notify the downstream layer that the data was not properly validated or verified. This notification might take the form of an error or warning, in some embodiments.

In some embodiments, the layer making the request is going to indicate in the request header to include a hash of a certain parameter set when in the response to be sent back. Then the requesting layer is going to make a record of its own hash of the parameter set based on its understanding of what it is asking for. Then when the requesting layer receives the response back, it will look up the hash that it computed for the request and compare it to the hash that is included in the response in order to ensure that there is a match. In these embodiments, if the upstream layer somehow produced an error or retrieved incorrect data, the hash that it generates would be based on incorrect parameters, and would not match generated at the downstream layer.

Pseudocode that demonstrates some embodiments of comparing validation parameters received from an upstream layer to validation parameters computed locally can be as follows:

```
boolean validate response signature ( ):
    string validation keys csv=read from Config( ) // com-
        pute validation signature locally from the forwarded
        request properties
    MD5 INIT(LOCAL_VALIDATION_SIGNATURE)
    foreach (string key in validation_keys_csv):
        VALUE=FWD_Req[key]
        MD5_UPDATE(LOCAL_VALIDATION_SIGNA-
            TURE, VALUE)
    // compare the validation signature
    UPSTREAM_VALIDATION_SIGNATURE
        =FWD_Resp.Headers['X-Edge-Validation-Signature'] if
    UPSTREAM VALIDATION SIGNATURE
        ==LOCAL_VALIDATION_SIGNATURE:
        is_response_valid=true
    else:
        is_response_valid=false
    SET_RESULT_TYPE(RESULT_SERVER_ERROR_
        VALIATION_FAILURE) return is_response_valid
end
```

In some embodiments, communication between the layers of the CDN would not use encryption, whereas communication between the CDN and other entities, such as the origin or the client would be encrypted. In some of these embodiments, when two cache layers are communicating, then only an unencrypted hash is exchanged between the layers and compared. This is because the various CDN layers might trust each other and also might be in a contained communication or network space. However, when a CDN cache is communicating with another entity, for example an L3 CDN cache layer communicating with an origin, then the verification data, such as the hash would be encrypted. This is because the communication would be venturing into unknown space, and there might be communication errors or bad actors present. Therefore, encrypting the verification data might be done for this communication in order to effectively manage other security related issues.

In some embodiments, including some of the embodiments described above, the upstream layer that is receiving the request and computing the hash of the specified values in order to return to the requesting layer, uses the values for the response it is creating to create the hash that it sends to the requesting layer. In other words, the upstream layer does not simply use the values of the request as it was parsed by the upstream layer, but instead uses the values of the data that it is returning. As an example, if the requesting layer informed the upstream layer to use are the URL of the request, the object name of the request, the method of the request, and the range the request, then the upstream layer will extract the URL that it is serving, the name of the object that it is returning, the method that used to process the data, and the range of the content that it is returning, and return an MD5 hash of these values back to the client or customer. The upstream layer would not simply use the requested URL, object name, method, and range that it parsed from the request that it received from the requesting layer. The upstream layer would use the values of the data that it is actually returning in response to the request.

In some embodiments, instead of requesting a hash of the values of certain parameters, a requesting layer might simply request that the values themselves be sent from the upstream layer to the requesting layer. In this case, the upstream layer would return the values corresponding to the requested parameters of the data that is being returned, or the values used to retrieve the data that is being returned. A hash would not be generated. In these embodiments, the requesting layer would compare the values of the requested parameters that are received from the upstream layer to the values that were actually sent in the request to the upstream layer in order to determine if there is a match or not.

In some embodiments, instead of matching the signature at the downstream layer, the signature can be matched at the upstream layer. In some of these embodiments, the requesting layer will compute the signature and forward it to the upstream layer. The upstream layer will do the signature validation. Therefore, instead of the matching the signature at the downstream layer to figure out whether or not to serve the content, some embodiments can instead do the matching of signature at the upstream layer, where it would make the decision whether the content is valid or not. For example, a downstream L2 layer will compute a signature of the values of selected parameters, and forward the signature, along with an identification of the parameters used to an upstream L3 layer. The L3 layer will compute the same signature, but instead use the values of the selected parameters it used, while forwarding the request to Origin. If the signature matches, the L3 cache would serve the response back to the L2 cache. Otherwise the L3 cache would send an Internal ServerError.

These embodiments of matching the signature at the upstream layer might be appropriate for internal layers of the CDN, but might not be appropriate for communication with another upstream entity, like the origin, for example. The CDN cannot rely on a $3^{rd}$ party server, such as the origin, to tell the CDN that the $3^{rd}$ party server provided the correct data with the correct parameters. This is especially true where there is a malicious attacker, such as a man-in-the-middle attack between the CDN and the origin. The origin, or the man-in-the-middle attacker could potentially return an incorrect response back, while performing faulty checks or not performing the appropriate comparisons at all.

Embodiments of a Distributed Numeric Sequence Generator

FIG. 1 illustrates a system that comprises a content distribution network communicating with a plurality of clients and an origin server site, where the CDN has a plurality of points of presence, each point of presence with a plurality of CDN servers and a content cache layer, where each of the CDN servers and content cache layer has a content validation component, according to some embodiments. Embodiments of a content distribution network 100 are described that may be implemented on or by a provider network, in some embodiments, that communicates with the plurality of clients 102, 104, and 106 through 108 (collectively referred to as 102-108). In other embodiments a content distribution network 100 may be implemented in enterprise networks or simple client-server networks, or any kind of network where a computer accesses a resource through a network.

The content distribution network 100 may be operated by an entity to provide one or more services, such as various types of content distribution services, accessible via the Internet and/or other networks to client(s) 102-108. The content distribution network 100 may include numerous data centers hosting various resource pools, such as collections of physical and/or virtualized computer servers, storage devices, networking equipment and the like, needed to implement and distribute the infrastructure and services offered by the content distribution network 100. In some embodiments the content distribution network 100 may employ computing resources for its provided services.

The client(s) 102-108 may encompass any type of client configurable to submit requests to the content distribution network 100. For example, a given client 102-108 may include a suitable version of a web browser or may include a plug-in module or other type of code module configured to execute as an extension to or within an execution environment provided by a web browser. Alternatively, a client 102-108 may encompass a client application such as a dashboard application (or user interface thereof), a media application, an office application or any other application that may make use of the computing resources to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, client(s) 102-108 may be configured to generate network-based services requests according to a Representational State Transfer (REST)-style network-based services architecture, a document-based or message-based or network-based services architecture, or another suitable network-based services architecture. In some embodiments, the content distribution network 100 may offer its services as web services, and the client(s) 102-108 may invoke the web services via published interfaces for the web services. In some embodiments, a client 102-108 (e.g., a computational client) may be configured to provide access to the content distribution network 100 in a manner that is transparent to applications implemented on the client(s) 102-108 utilizing content distribution resources provided by the content distribution network 100.

The client(s) 102-108 may convey network-based services requests to the content distribution network 100 via network connections, such as a large-scale network 120, which, in some embodiments, can be the Internet. In various embodiments, network connections may encompass any suitable combination of networking hardware and protocols necessary to establish network-based communications between clients 102-108 and the content distribution network 100. For example, a network connection may generally encompass the various telecommunications networks and service providers that collectively implement the Internet. A network connection may also include private networks such as local area networks (LANs) or wide area networks (WANs) as well as public or private wireless networks. For example, both a client 102-108 and the content distribution network 100 may be respectively provisioned within enterprises having their own internal networks. In such embodiments, the network connection may include the hardware (e.g., modems, routers, switches, load balancers, proxy servers, etc.) and software (e.g., protocol stacks, accounting software, firewall/security software, etc.) necessary to establish a networking link between the client 102-108 and the Internet as well as between the Internet and the content distribution network 100. In some embodiments, client(s) 102-108 may communicate with the content distribution network 100 using a private network rather than the public Internet.

In the illustrated embodiment, clients 102-108 may request electronic content from a merchant that owns the content located on the origin servers 182 of the origin server site 180. The merchant might also own and/or operate the origin servers 182 of the origin server site 180. Examples of electronic content may include but are not limited to electronic representations of movies, music, and television programming. In one example, the merchant may sell or rent electronic content to clients through a commerce interface, such as a web portal configured to offer an electronic catalog of items as well as logic for accepting payment for items of such catalog.

In a separate communication that is not shown, a client 102-108 can communicate with a merchant system to carry out transactions for electronic content. Merchant system(s) may include systems configured to implement such a commerce interface. Clients 102-108 may carry out transactions for electronic content with merchant system over one or more networks 120 that are configured to transport electronic representations of data or information. In various embodiments, the merchant system(s) may rely on the content distribution network 100 for the actual delivery of content to client systems 102-108. For instance, content distribution network 100 may store electronic content that the merchant offers for sale to clients. The content sources may charge the merchant a fee for delivery of such content to the clients.

Clients 102-108 may be implemented by one or more computers or electronic devices configured to receive (e.g., download) and playback electronic content from the content distribution network 100. In various embodiments, clients 102-108 may al so include reporting logic configured to report quality metrics associated with content sources to merchant systems. For instance, when a given client system 102-108 is engaged in a streaming content session with the content distribution network 100, the client system may record quality metrics associated with that session and send such metrics to merchant system(s). In various embodiments, different clients of clients 102-108 may perform similar reporting actions. Merchant systems may store the metrics for multiple sessions within data store and use such metrics to generate rankings of content sources. A given ranking may rank content sources based on an expected measure of quality for a content stream between one of the content sources and one of the clients. In various embodiments, the merchant system(s) may generate a given ranking such that the cost of content delivery (e.g., the cost that content sources charge the merchant for delivering content to the clients) influences the rank of content sources.

In the illustrated embodiment, the content distribution network 100 may be implemented by one or more CDN servers 134, 138, 144, 148 as part of a point of presence 130 . . . 140, or other electronic devices, that are configured to provide (e.g., stream or transfer) data to clients 102-108. In various embodiments, a given CDN may include one or more servers, routers, caches, and other components in order to provide content to multiple geographically-dispersed clients. In various embodiments, any given component of the content distribution network 100 may be implemented on one or more computers, such as that of FIG. 9 described below. In various embodiments, the origin server site 180 may include one or more computers or other electronic devices configured to perform the functionality described herein. In various embodiments, the origin server site 180 may be implemented on one or more computers, such as that of FIG. 9 described below. Likewise, clients 100 may each be implemented as one or more computers or other electronic devices configured to perform the functionality described herein. Examples of clients may include any computer or electronic device configured to playback (or "play") streamed content received from a remote entity. In various embodiments, such clients may include one or more buffers in which to store portions of such streamed content. For instance, a client may play content retrieved from its buffer such that nominal network variations or latencies do not affect the playback of the content. In some cases, a given client may fill its content buffer with data and then begin playback of the data from that buffer. Buffer sizes may be configurable to promote uninterrupted playback of content.

In the embodiments shown in FIG. 1, the origin server site 180 is connected to the content distribution network 100 through one or more backbone network(s). In various embodiments, this backbone network(s) may include but are not limited to local area networks (LANs) (e.g., a corporate or Ethernet network), wide area networks (WANs) (e.g., the Internet), transit networks, internet service provider (ISP) networks, some other type of electronic network, or some combination thereof. In various embodiments, any communication between components or systems described herein (e.g., sending, receiving, providing, acquiring, transmitting, etc.) may be performed over the backbone network(s).

The system in FIG. 1 might also include a router or load balancer, which can be network appliance which performs a network connection termination function in order to provide an endpoint for the network connection from the clients, in some embodiments. In FIG. 1, there can be network connections shown from each of the clients to the router or load balancer. The router or load balancer might route packets to and from the plurality of the points of presence 130, 140 of the content distribution network 100.

The system can also include network interfaces, tunnel network interfaces, and stream sockets. A network interface can be a device which sends packets to the network and receive packets from the network, in some embodiments. Network interfaces can be attached to either the potential router or load balancer, or the content distribution network 100. If a network interface is attached to the router or load balancer or the content distribution network 100, then the router or load balancer, or the content distribution network 100 will be receiving and processing all network packets which are sent to the network interface. Network interface can have IP addresses associated with it. A tunnel network interface ("TNI") can be a type of network interface which is attached to the content distribution network 100 and used to establish tunnel between the origin server site 180 and the content distribution network 100, in some embodiments. A stream socket can be a representation of the network connection with the clients 102-108, in some embodiments. It can have associated information about the remote endpoint on a particular client 102-108, as well as the corresponding network connection state.

The router or load balancer might be present in front of the content distribution network 100 or as part of the content distribution network 100, depending on the embodiment. When a client, for example 102, requests the content distribution network 100 for content, the router or load balancer might first receive the request, and then might forward the request to one of the points of presence 130 . . . 140 of the content distribution network 100, in these embodiments. The router or load balancer might use a load balancing scheme to determine a point of presence 130 . . . 140 of the plurality of hosts to forward the request to, in some embodiments. The router or load balancer might use performance statistics from the point of presence 130 . . . 140 to inform its determination of which point of presence 130 . . . 140 to forward the request to, in some embodiments. In other embodiments, the router or load balancer might forward requests from specific clients only to specific points of presence.

In the embodiments shown in FIG. 1, the content distribution network 100 comprises a plurality of points of presence, 130 . . . 140. Each of the content distribution network's points of presence (130 . . . 140) caches values obtained from one of the origin servers 182 at the origin server site 180, at the content cache layer (132 . . . 142). The content distribution network 100 validates the content that is received from the origin using the content validators 133, 135, 139, 143, 145, 149. This can be done, for example, to ensure that the correct origin is being communicated with. Some embodiments of the current invention will also validate the method being applied so that an incorrect method is not executed or sent to the origin. By employing these validation mechanisms, these embodiments are avoiding incorrect items from being cached or served in the first place.

In the embodiments shown in FIG. 1, the CDN servers 134, 138, 144, 148 will require a validation signature and/or hash to be received from the origin servers 182 . . . 186 at the origin server site 180 for at least some requests. In the embodiments shown in FIG. 1, there are simply two layers communicating with each other, the CDN and the origin. In these embodiments, the CDN servers 134, 138, 144, 148 then make a request to the origin servers 182 . . . 186 at the origin server site 180 in such a way to ensure that the response from the origin servers 182 . . . 186 is the correct response to the request that was sent to the origin. In some of these embodiments, the CDN servers 134, 138, 144, 148 includes a header to the request. This can be performed by the CDN servers 134, 138, 144, 148 or the content validators 135, 139, 145, and 149 of the CDN servers. This header informs the appropriate parameter encoder 184 ... 188 on the appropriate origin server 182 ... 186 to use one or more specified properties of the request, in order to create a signature out of the specified properties. Some of these properties which the CDN servers 134, 138, 144, 148, or the content validators 135, 139, 145, and 149 of the CDN servers, might inform appropriate parameter encoder 184 ... 188 on the appropriate origin server 182 ... 186 to use are the URL and the method of the request and/or the range the request. The CDN servers 134, 138, 144, 148 might inform the origin server 182 ... 186 to use any other property of the request which it deems important or which the requesting layer wishes to include.

After the appropriate origin server 182 ... 186 receives the request, in these embodiments, the origin retrieves the data from, for example, its storage devices, and then sends a response back to the requesting CDN server 134, 138, 144, 148. When sending the response, the parameter encoder 184 ... 188 on the appropriate origin server 182 ... 186 will extract the values for the properties which the requesting CDN server 134, 138, 144, 148 specified, and create, in some embodiments, an MD5 hash of the values. In other embodiments the parameter encoders 184 ... 188 on the origin servers 182 ... 186 will create a different kind of hash, or a different kind of signature using some or all of these values. The appropriate origin server 182 ... 186 will send the MD5 hash value back to the requesting layer, in some embodiments. As an example, if the CDN server 134, 138, 144, 148 informed the appropriate origin server 182 ... 186 to use are the URL of the request, the method of the request, and the range the request, then the appropriate origin server 182 ... 186, or the parameter encoder 184 ... 188 on the appropriate origin server 182 ... 186, will extract the URL that it is serving, the method that it received, and the range of the content that it is returning. The parameter encoder 184 ... 188 on the appropriate origin server 182 ... 186 will then create an MD5 hash, or another kind of hash, signature, or encoding of these values, and then return this encoding of these values back to the requesting CDN server 134, 138, 144, 148. The content validator 135, 139, 145, and 149 of the requesting CDN server 134, 138, 144, 148 will itself also create a similar encoding on its end using the requested values. The content validator 135, 139, 145, and 149 of the requesting CDN server 134, 138, 144, 148 will compare the hash received from the appropriate origin server 182 ... 186 with the hash that it computed. If the hash values match, then the content validator 135, 139, 145, and 149 of the requesting CDN server 134, 138, 144, 148 knows that the origin sent the correct data. If the hashes do not match, then the data might be discarded, and an error response returned to the client, in some embodiments. In other embodiments, the data might be further used by the requesting CDN server, but the data might comprise or be associated with an indication that the data was not properly verified or validated. For example, the requesting CDN server might use the data to respond to a request from a downstream layer, but might notify the downstream layer that the data was not properly validated or verified. This notification might take the form of an error or warning, in some embodiments.

Instead of simply returning a hash value, the parameter encoder 184 ... 188 on the appropriate origin server 182 ... 186 can also, in some embodiments, encrypt the hash before it is returned to the requesting layer. The hash can be encrypted, for example, to prevent certain kinds of attacks, such as a man-in-the middle attack between the CDN 100 and the origin server site 180. The content validator 135, 139, 145, and 149 of the requesting CDN server 134, 138, 144, 148 then receives the encrypted hash from the appropriate origin server 182 ... 186. At some point either before or after the content validator 135, 139, 145, and 149 of the requesting CDN server 134, 138, 144, 148 receives the encrypted hash, the content validator 135, 139, 145, and 149 will itself also create a similar hash on its end using the request properties. The content validator 135, 139, 145, and 149 will, in these embodiments, decrypt the encrypted hash from the origin, and then compare the hash received from the origin with the hash that it computed. If the hash values match, then the content validator 135, 139, 145, and 149 knows that the origin sent the correct data. If the hashes do not match, then the data might be discarded, and an error response returned to the customer, in some embodiments. In other embodiments, the data might be further used by the requesting CDN server 134, 138, 144, 148, but the data might comprise or be associated with an indication that the data was not properly verified or validated. For example, the requesting CDN server 134, 138, 144, 148 might use the data to respond to a request from a downstream layer, but might notify the downstream layer that the data was not properly validated or verified. This notification might take the form of an error or warning, in some embodiments. The content validator 133, 143 in the content cache layer 132, 142 can act in the same or similar way to the content validator 135, 139, 145, and 149 of the requesting CDN server 134, 138, 144, 148, in some embodiments.

These various types of data verification and/or validation can be extended to include the requesting client or customer in order to provide more complete protection. The procedures outlined above can be extended to the communication between the client or customer 102, 108 and the CDN 100. Some clients or customers 104, 106 will not have any response validation functionality, and thus will not be able to validate the response for the CDN. However, some clients or customers 102, 108 will implement this functionality to ensure they are receiving the correct content requested.

The client or customer 102, 108 can make a request to the CDN 100 in such a way to ensure that the response from this CDN is the correct response to the request that was sent to this CDN layer. In some of these embodiments, the client or customer 102, 108 includes a header to the request. This header informs the content validator 135, 139, 145, and 149 of the CDN server 134, 138, 144, 148 or the content validator 133, 143 in the content cache layer 132, 142 to use one or more specified properties of the request, in order to create a hash and/or signature out of the specified properties. Some of these properties which the client or customer 102, 108 might inform the content validators 133, 135, 139, 143, 145, and 149 to use are the URL and the method of the request and/or the range the request. The client or customer 102, 108 might inform this CDN layer to use any other property of the request which it deems important or which the client or customer wishes to include.

After the CDN server 134, 138, 144, 148 or the content cache layer 132, 142 receives the request, in these embodiments, it retrieves the data from, for example, further upstream layers such as the origin servers 182 ... 186 at the origin server site 180, and then sends a response back to the client or customer 102, 108. When sending the response, the content validator 135, 139, 145, and 149 of the CDN server 134, 138, 144, 148 or the content validator 133, 143 in the content cache layer 132, 142 will extract the values for the properties which the client or customer specified, and create, in some embodiments, an MD5 hash of the values. In other embodiments the content validator 135, 139, 145, and 149 of the CDN server 134, 138, 144, 148 or the content validator 133, 143 in the content cache layer 132, 142 will create a different kind of hash, or a different kind of signature using some or all of these values. The CDN server 134, 138, 144, 148 or the content cache layer 132, 142 will send the hash and/or signature, such as the MD5 hash value, back to the client or customer. As an example, if the client or customer 102-108 informed CDN server 134, 138, 144, 148 or the content cache layer 132, 142 to use are the URL of the request, the method of the request, and the range the request, then the content validator 135, 139, 145, and 149 of the CDN server 134, 138, 144, 148 or the content validator 133, 143 in the content cache layer 132, 142 will extract the URL that it is serving, the method that it received, and the range of the content that it is returning, and return an MD5 hash of these values back to the client or customer 102-108. The response validator 103, 109 of client or customer 102, 108 will itself also create a similar hash on its end using the requested values. The response validator 103, 109 of client or customer 102, 108 will compare the hash received from this CDN layer with the hash that it computed. If the hash values match, then the response validator 103, 109 of client or customer 102, 108 knows that content distribution network 100 sent the correct data. If the hashes do not match, then the data might be discarded, and another request generated, in some embodiments. In other embodiments, the data might be further used by the requesting client or customer 102, 108, but the data might comprise or be associated with an indication that the data was not properly verified or validated.

Instead of simply returning a hash value, the content validator 135, 139, 145, and 149 of the CDN server 134, 138, 144, 148 or the content validator 133, 143 in the content cache layer 132, 142 can also, in some embodiments, encrypt the hash before it is returned to the client or customer 102, 108. The hash can be encrypted, for example, to prevent certain kinds of attacks, such as a man-in-the middle attack between the client or customer 102, 108 and the content distribution network 100. The client or customer 102, 108 then receives the encrypted hash from content distribution network 100. At some point either before or after the client or customer 102, 108 receives the encrypted hash, the response validator 103, 109 of client or customer 102, 108 will itself also create a similar hash on its end using the request properties. The response validator 103, 109 of client or customer 102, 108 will, in these embodiments, decrypt the encrypted hash from the content validator 135, 139, 145, and 149 of the CDN server 134, 138, 144, 148 or the content validator 133, 143 in the content cache layer 132, 142, and then compare the hash received from the upstream cache layer with the hash that it computed. If the hash values match, then the client or customer 102, 108 knows that content distribution network 100 sent the correct data. If the hashes do not match, then the data might be discarded, and another request generated, in some embodiments. In other embodiments, the data might be further used by the requesting client or customer 102, 108, but the data might comprise or be associated with an indication that the data was not properly verified or validated.

Figure 2:
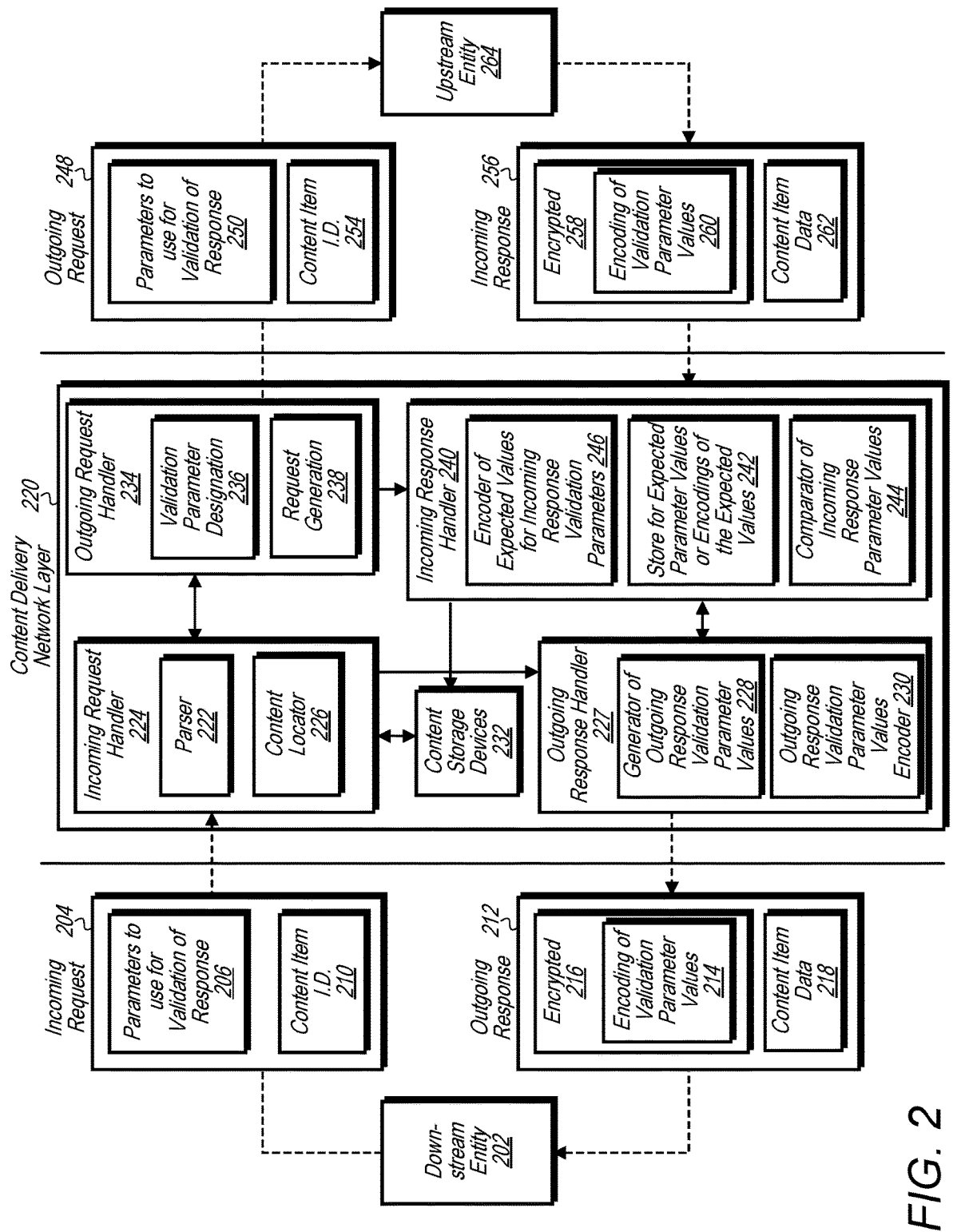
FIG. 2 illustrates an embodiment of a layer within a content distribution network that communicates with a downstream entity and an upstream entity, where the layer comprises an incoming request handler, an outgoing request handler, and incoming response handler, and an outgoing response handler.

FIG. 2 illustrates an embodiment of a layer 220 within a content distribution network that communicates with a downstream entity and an upstream entity, where the layer comprises an incoming request handler, an outgoing request handler, and incoming response handler, and an outgoing response handler. The layer first receives an incoming request 204 from a downstream entity 202. This incoming request 204 includes at least parameters to use for validation of a response 206, and a content item identification parameter 210. The parameters to use for validation of a response 206 might comprise the content item identification 210 in some embodiments, or the content item identification might be separate, in other embodiments.

The incoming request handler 224 of the content delivery network layer 220 handles this request. The incoming request handler 224 comprises a parser 222 to parse the incoming request 204, and a content locater 226. The parser parses the request to determine the content item that is being requested, and the parameters that the downstream entity requires for validation. The content locater 226 determines whether the content requested is stored in the local content storage devices 232. If it is, then this content is simply passed to the outgoing response handler 227, which provides the response.

However, if the content is not located in the local content storage devices 232, then the incoming request handler 224 notifies the outgoing request handler 234 to retrieve the content from an upstream entity 264. The outgoing request handler 234 determines and designates parameters to use for the outgoing request in a validation parameter designator 236. These can be the same or different parameters as the parameters it was sent 206 in the incoming request 204. The request generation module 238 generates an outgoing request 248 that comprises parameters to use for validation of a response 250, and the identification of the content item 254 requested. The parameters to use for validation of a response 250 might comprise the content item identification 254 in some embodiments, or the content item identification might be separate, in other embodiments. This outgoing request 248 is sent to the upstream entity 264.

The upstream entity 264 provides an incoming response 256. This incoming response 256 includes an encoding of the validation parameter values 260, such as a hash. This encoding might also be encrypted 258, in some embodiments. The incoming response 256 from the upstream entity also includes the content item that was requested 262.

The incoming response handler 240 of the CDN layer 220 processes this response. The incoming response handler comprises a store for expected parameter values or encoding the expected parameter values 242. The expected values might be stored either encoded or unencoded. If they are stored unencoded, then they will need to be encoded before they are compared with any received encoded values from an incoming response. An encoder of the expected values for incoming response validation Parameters encodes the expected values of the validation parameters that the outgoing request handler 234 sent to the upstream entity 264. It might store the encoding of these expected values of the validation parameters in the store for expected parameter values or encodings of the expected parameter values 242. When the incoming response 256 is finally received, then the comparator of incoming response parameter values 244 module compares the encoding of the expected values of the validation parameters (where either the encoded or unencoded expected parameter values are stored in the store 242), to the encoding of validation parameter values 260 received in the incoming response 256. If the encoding match, then the incoming response handler notifies the outgoing response handler that it can use the content item data 262 that was received. In addition, the content item data 262 can be cached in the content storage devices 232.

The outgoing response handler 227 formulates the outgoing response 212 that is sent to the downstream entity 202. The generator of outgoing response validation parameter values 228 determines the values of parameters of the content item data 262 that was received from the upstream entity 264, or the values of the parameters of the content item that was retrieved from the content storage devices 232, as the case may be. These values are for the parameters that were designated in the incoming request 204 as the parameters to use for validation of a response 206. The outgoing response validation parameter values encoder 230 encodes these parameters. They can be encoded as a hash of incoming validation parameters 214, in some embodiments, or as some other encoding in other embodiments. The encoding 214 can also be encrypted or signed 216, in some embodiments. The outgoing response handler 227 also includes the content item data 218 in the outgoing response 212. This can be the content item data 262 that was received from the upstream entity 264, or the content item that was retrieved from the content storage devices 232, as the case may be. This outgoing response 212 is then sent back to the downstream entity 202 in response to the incoming request 204.

Figure 3:
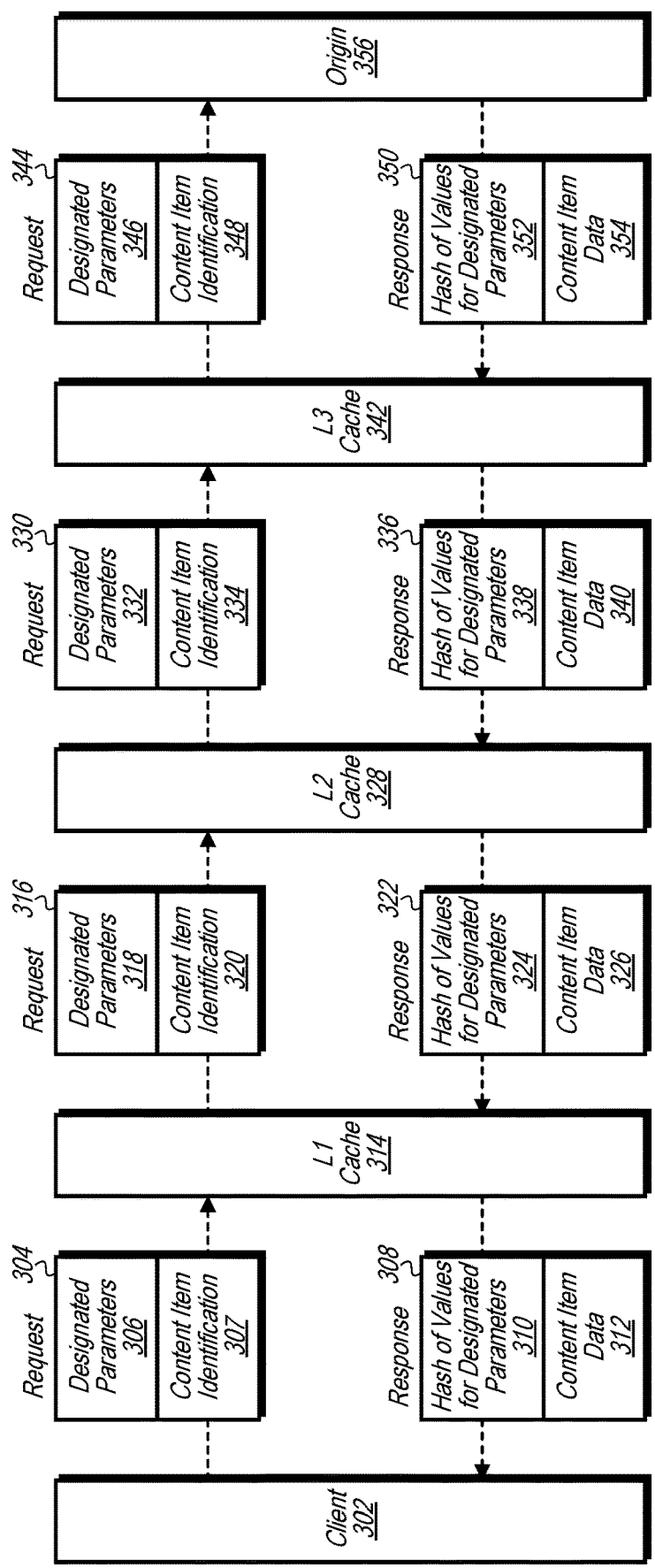
FIG. 3 illustrates a content distribution network with 3 cache layers that communicates with an origin and a client, where each cache layer sends a request that comprises designated parameters and a content item identification, and receives a response that comprises a hash of the values for the designated parameters, and the content item, according to some embodiments.

FIG. 3 illustrates a content distribution network with 3 cache layers, L1 Cache 314, L2 Cache 328, and an L3 Cache 342 that communicates with an origin 356 and a client 302. Each cache layer 314, 328, 342 sends a request 316, 330, 344 that comprises designated parameters 318, 332, 346 and a content item identification 320, 334, 348, and receives a response 322, 336, 350 that comprises a hash of the values for the designated parameters 324, 338, 352, and the content item 326, 340, 354, according to some embodiments. In these other embodiments, a requesting cache layer 314, 328, 342 makes a request 316, 330, 344 to an upstream layer in such a way to ensure that the response 322, 336, 350 from the upstream layer is the correct response to the request that was sent to the upstream layer. In some of these embodiments, the requesting cache layer 314, 328, 342 includes a header to the request. This header informs the upstream cache layer to use one or more specified properties of the request 318, 332, 346, in order to create a hash and/or signature 324, 338, 352 out of the specified properties. Some of these properties which the requesting layer 302, 314, 328, 342 might inform the upstream layer to use are the URL and the method of the request and/or the range the request. The requesting layer 302, 314, 328, 342 might inform the upstream layer to use any other property of the request which it deems important or which the requesting cache layer wishes to include.

After the upstream layer, which can be the L1 cache 314, L2 cache 328, the L3 cache 342, or the origin 356, receives the request 304, 316, 330, 344, in these embodiments, the upstream layer retrieves the data from, for example, further upstream layers such as the origin 356, and then sends a response 308, 322, 336, 350 back to the requesting cache layer 314, 328, 342 or client 302. When sending the response 308, 322, 336, 350, the upstream layer will extract the values for the properties which the requesting cache layer specified, and create, in some embodiments, an MD5 hash of the values 310, 324, 338, 352. In other embodiments the upstream layer will create a different kind of hash, or a different kind of signature using some or all of these values. The upstream layer will send the hash and/or signature 310, 324, 338, 352, such as the MD5 hash value, back to the requesting cache layer 314, 328, 342 or client 302. As an example, if the requesting cache layer 314, 328, 342 or client 302 informed the upstream layer to use are the URL of the request, the method of the request, and the range the request, then the upstream layer will extract the URL that it is serving, the method that it received, and the range of the content that it is returning, and return an MD5 hash of these values 310, 324, 338, 352 back to the requesting cache layer 314, 328, 342 or client 302. The requesting cache layer 314, 328, 342 or client 302 will itself also create a similar hash on its end using the requested values. The requesting layer 314, 328, 342 or client 302 will compare the hash received from the upstream layer with the hash that it computed. If the hash values match, then the requesting cache layer 314, 328, 342 or client 302 knows that the upstream layer sent the correct data item 312, 326, 340, 354. If the hashes do not match, then the data might be discarded, and an error response returned to the requestor, such as the customer or client 302, in some embodiments. In other embodiments, the data might be further used by the requesting cache layer 314, 328, 342 or client 302, but the data might comprise or be associated with an indication that the data was not properly verified or validated. For example, the requesting cache layer 314, 328, 342 might use the data to respond to a request from a downstream layer, but might notify the downstream layer that the data was not properly validated or verified. This notification might take the form of an error or warning, in some embodiments.

Instead of simply returning a hash value, the upstream cache layer 314, 328, 342, or origin 356 can also, in some embodiments, encrypt the hash before it is returned to the requesting cache layer. The hash can be encrypted, for example, to prevent certain kinds of attacks, such as a man-in-the middle attack between the requesting cache layer and the upstream cache layer. The requesting cache layer 314, 328, 342 or client 302 then receives the encrypted hash from the upstream cache layer 314, 328, 342, or origin 356. At some point either before or after the requesting cache layer 314, 328, 342 or client 302 receives the encrypted hash 310, 324, 338, 352, the requesting cache layer 314, 328, 342 or client 302 will itself also create a similar hash on its end using the request properties. The requesting cache layer 314, 328, 342 or client 302 will, in these embodiments, decrypt the encrypted hash 310, 324, 338, 352 from the upstream cache layer 314, 328, 342, or origin 356, and then compare the hash received 310, 324, 338, 352 from the upstream cache layer 314, 328, 342, or origin 356 with the hash that it computed. If the hash values match, then the requesting cache layer 314, 328, 342 or client 302 knows that the upstream cache layer 314, 328, 342, or origin 356 sent the correct data. If the hashes do not match, then the data might be discarded, and an error response returned to the requestor, such as the customer, in some embodiments. In other embodiments, the data might be further used by the requesting cache layer 314, 328, 342 or client 302, but the data might comprise or be associated with an indication that the data was not properly verified or validated. For example, the requesting cache layer 314, 328, 342 might use the data to respond to a request from a downstream layer, but might notify the downstream layer that the data was not properly validated or verified. This notification might take the form of an error or warning, in some embodiments.

More specifically, the client or customer 302 can make a request to the L1 CDN layer 314 closest to the client or customer in such a way to ensure that the response 308 from this CDN layer is the correct response to the request 304 that was sent to this CDN layer 314. In some of these embodiments, the client or customer 302 includes a header to the request. This header informs the CDN layer closest to the client or customer 314 to use one or more specified properties 306 of the request 304, in order to create a hash and/or signature out of the specified properties. Some of these properties which the client or customer might inform this CDN layer to use are the URL and the method of the request and/or the range the request. The client or customer might inform this CDN layer to use any other property of the request which it deems important or which the client or customer wishes to include.

After the L1 layer 314 receives the request 304, in these embodiments, this CDN layer 314 retrieves the data from, for example, further upstream layers, and then sends a response 308 back to the client or customer. When sending the response, this CDN layer 314 will extract the values for the properties which the client or customer specified, and create, in some embodiments, an MD5 hash of the values 310. In other embodiments this CDN layer will create a different kind of hash, or a different kind of signature using some or all of these values. The L1 layer 314 will send the hash and/or signature 310, such as the MD5 hash value, back to the client or customer 302. The client or customer 302 will itself also create a similar hash on its end using the requested values. The client or customer 302 will compare the hash received 310 from the L1 layer 314 with the hash that it computed. If the hash values match, then the client or customer 302 knows that the L1 CDN layer 314 sent the correct data 312. If the hashes do not match, then the data might be discarded, and another request generated, in some embodiments. In other embodiments, the data might be further used by the client or customer 302, but the data might comprise or be associated with an indication that the data was not properly verified or validated.

Figure 4:
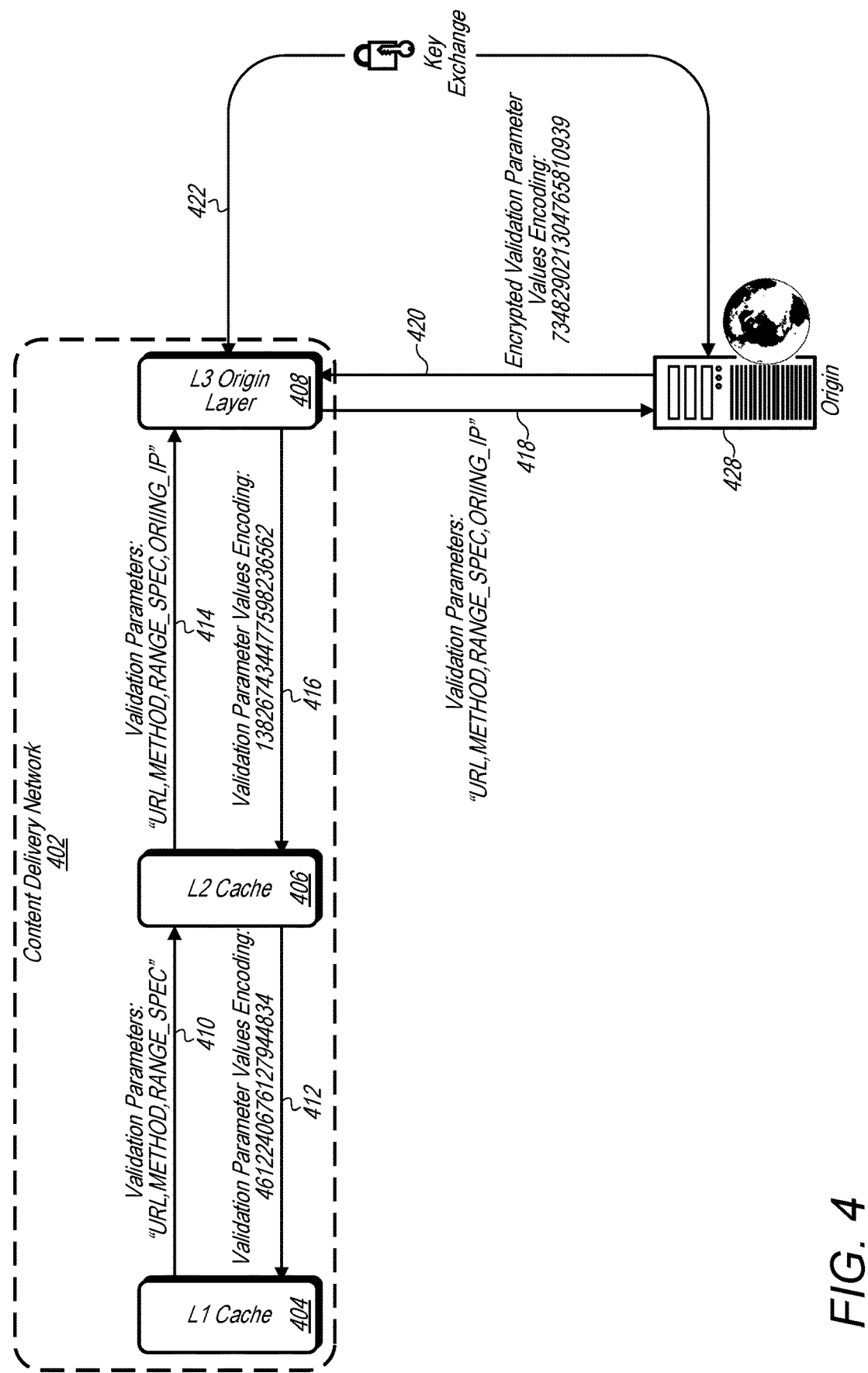
FIG. 4 illustrates a CDN with three layers of cache that communicates with an origin using a key exchange, where the communication involves a layer sending a request that includes identification of validation parameters and receiving a response that is an encoding of the values of the validation parameters, according to some embodiments.

FIG. 4 illustrates a CDN 402 with three layers of cache 404, 406, 408, that communicates with an origin 428 using a key exchange 422, where the communication involves a layer sending a request that includes identification of validation parameters 410, 414, 418 and receiving a response that is an encoding of the values of the validation parameters 412, 416, 420, according to some embodiments. For example, L1 404 sends a request 410 to L2 406 and identifies the "URL", "METHOD", and "RANGE_SPEC" as parameters to encode. L2 406 sends a response back that is an encoding 412 of the values of these parameters. As another example, L2 406 sends a request 414 to L3 408 and identifies the "URL", "METHOD", and "RANGE_SPEC", and originating IP address or "ORIING _IP" as the parameters to encode 414. L3 408 sends a response back that is an encoding 416 of the values of these parameters. This encoding 416 has a different value than the encoding 412 sent from L2 to L1, because a different set of parameters were used.

Though this approach will potentially validate a lot of request properties before serving the content, there could still be cases where the L3 origin layer 408 could think it's talking to origin 428 but it's actually communicating with another origin. There could also be other cases where a misbehaving origin 428 could return 420 an incorrect content for a given request. Or there could be a man-in-the-middle spoofing an origin and sending malicious content back. Therefore, the solution can be extended to the origin 428, in some embodiments. The L3 cache 408 can expect an encoding from the origin for a given request. The L3 cache 408 will serve the content if and only if the encoding from the origin 428 matches the encoding computed locally. In order for the L3 cache to trust that the signature that came from an origin, it can be cryptographic, in some embodiments, such as a (a)symmetric key encrypted signatures, for example. This also identifies the origin to the L3 cache.

Therefore, as another example, L3 408 sends a request 418 to the origin 428 and identifies the "URL", "METHOD", and "RANGE_SPEC", and originating IP address or "ORIING _IP" as the parameters to encode 418. The origin 428 sends a response back that is an encoding 420 of the values of these parameters. This encoding 420 has a different value than the encoding 412 sent from L2 to L1, because a different set of parameters were used. In addition, the encoding has a different value than the encoding 416 sent from L3 408 to L2 406, because the encoding 420 uses encryption to encryption the validation parameter values, while the encoding 416 does not use encryption.

Figure 5:
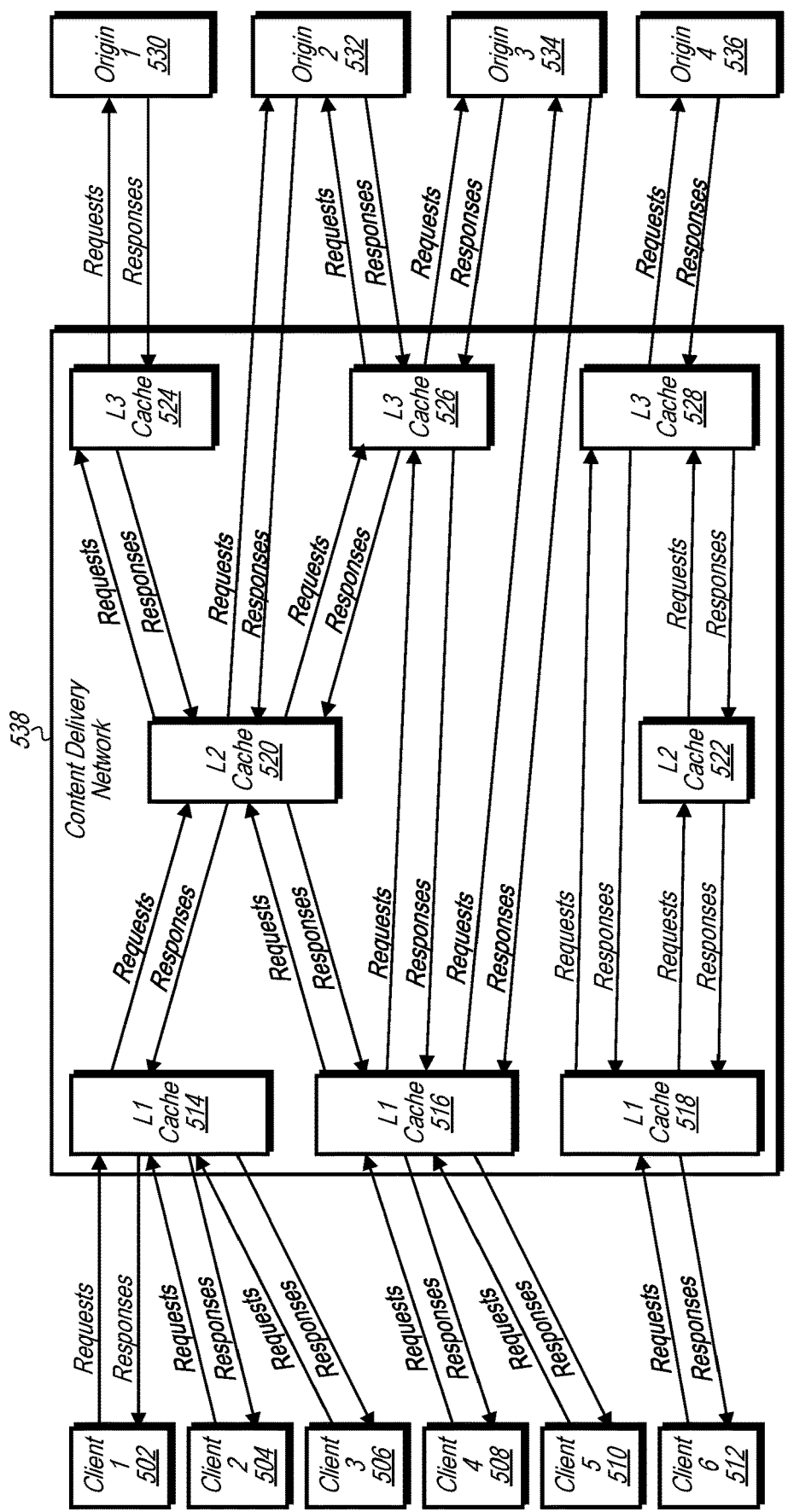
FIG. 5 illustrates the communication of a CDN with multiple layers of cache, and multiple instances of each layer of cache, according to some embodiments, where the CDN sends requests to, and receives responses from, a plurality of origins, and receives requests from, and sends responses to, a plurality of clients.

FIG. 5 illustrates the communication of a CDN 538 with multiple layers of cache L1, L2 and L3, and multiple instances of each layer of cache, according to some embodiments, where the CDN 538 sends requests to, and receives responses from, a plurality of origins 530, 532, 534, and 536, and receives requests from, and sends responses to, a plurality of clients 502-512. A client might send requests to and receive responses from a particular L1 cache of the CDN 538. This L1 cache might be the point of presence of the CDN that is closest to the client, in some embodiments. For example, clients 1, 2, and 3 (502, 504, and 506) send requests to and receive responses from the L1 cache 514. Clients 4 and 5 (508 and 510) send requests to and receive responses from L1 cache 516. Client 6 sends requests to and receives responses from L1 cache 518.

The L1 caches in turn send requests to and receive responses from a plurality of L2 caches 520, 522, or to/from the L3 caches 524, 526, 528, and/or to/from the origins 530, 532, 534, 536. For example, L1 caches 514, 516 send requests to and receive responses from L2 cache 520. L1 cache 518 send requests to and receive responses from L2 cache 522. L1 cache 516 also sends requests to and receives responses from L3 cache 526, and to/from origin 534. L1 cache 518 also sends requests to and receives responses from L3 cache 528. The L2 caches in turn send requests to and receive responses from the plurality of L3 caches 524, 526, 528, and/or to/from the origins 530, 532, 534, 536. L2 cache 520 send requests to and receive responses from L3 caches 524 and 526, as well as origin 532. L2 cache 522 send requests to and receive responses from L3 caches 526 and 528. The L3 caches in turn send requests to and receive responses from a plurality of origins 530, 532, 534, 536, as well as the L2 and L1 caches. L3 cache 524 send requests to and receive responses from Origin 1 530. L3 cache 526 send requests to and receive responses from origins 2 and 3 532, 534. L3 cache 528 send requests to and receive responses from origin 4 536. These requests and responses can use the data and parameter validation techniques and procedures described herein, in some embodiments.

Figure 6:
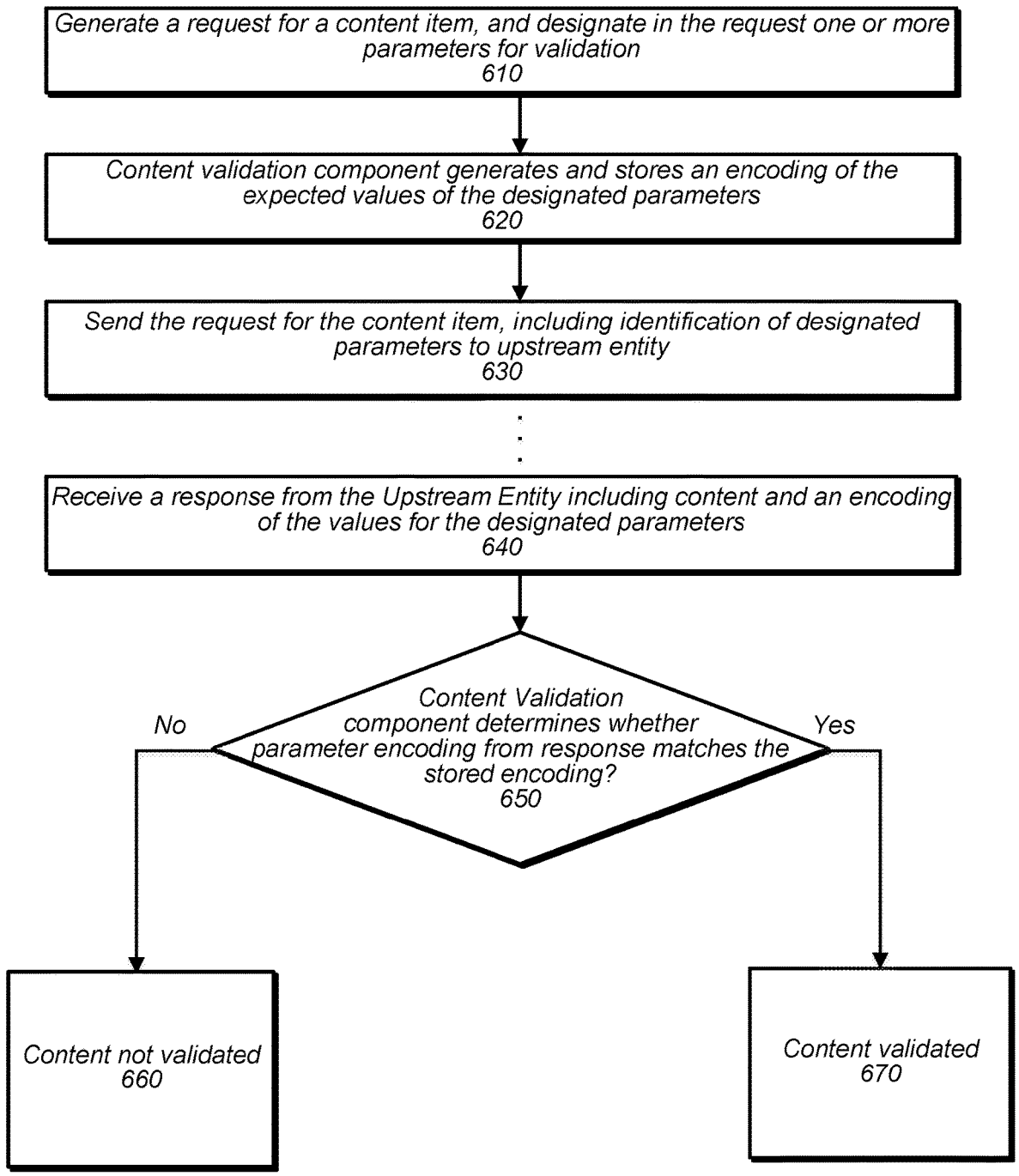
FIG. 6 is a flowchart of an illustrative method of generating a request for a content item that includes parameters for validation, sending the request to an upstream entity, receiving a response from the upstream entity and potentially validating the response, according to some embodiments.

FIG. 6 is a flowchart of an illustrative method of generating a request for a content item that includes parameters for validation, sending the request to an upstream entity, receiving a response from the upstream entity and potentially validating the response, according to some embodiments. The flowchart begins at 610, where a requesting entity generates a request for a content item, and designates in the request one or more parameters for validation. Then the flowchart transitions to 620 in which a content validation component of the requesting entity generates and stores the encoding of the expected values of designated parameters. The flowchart then sends the request for the content item, including an identification of the designated parameters to an upstream entity at 630. Sometime later, a response is received from the upstream entity including content and an encoding of the values for the designated parameters at 640.

The flowchart then transitions to 650 where a content validation component determines whether parameter encoding from the response matches the stored encoding. If so, then the content is validated at 670. If not, then the content is not validated at 660. If the content is not validated, then the data might be discarded, in some embodiments. In other embodiments, the data might be further used by the requesting entity, but the data might comprise or be associated with an indication that the data was not properly verified or validated. For example, the requesting entity might use the data to respond to a request from a further downstream layer, but might notify the downstream layer that the data was not properly validated or verified. This notification might take the form of an error or warning, in some embodiments.

Figure 7:
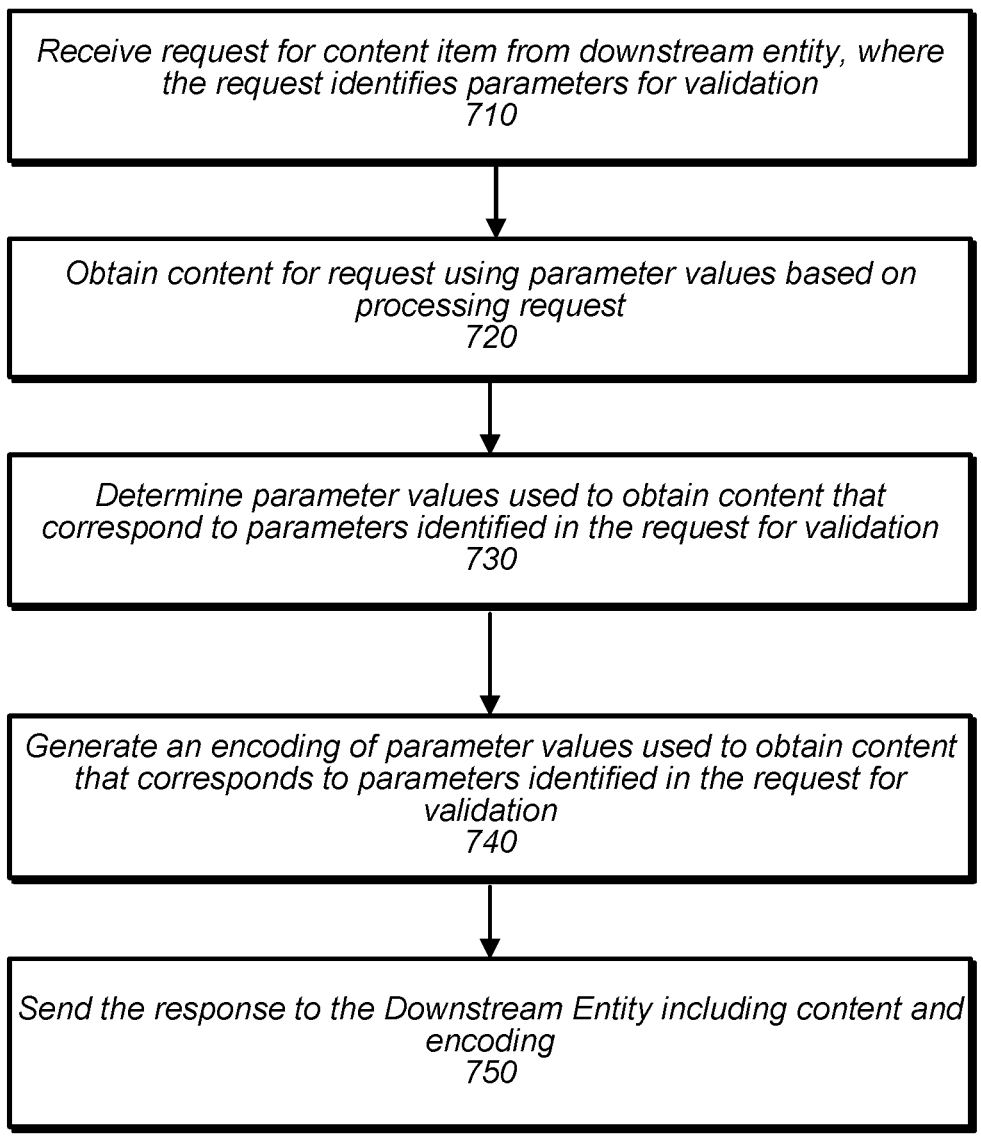
FIG. 7 is a flowchart of an illustrative method of receiving a request for a content item from a downstream entity that includes parameters for validation, obtaining content for a response, determining the parameter values, generating an encoding of the parameter values, and sending a response back to the downstream entity, according to some embodiments.
Figure 8A:
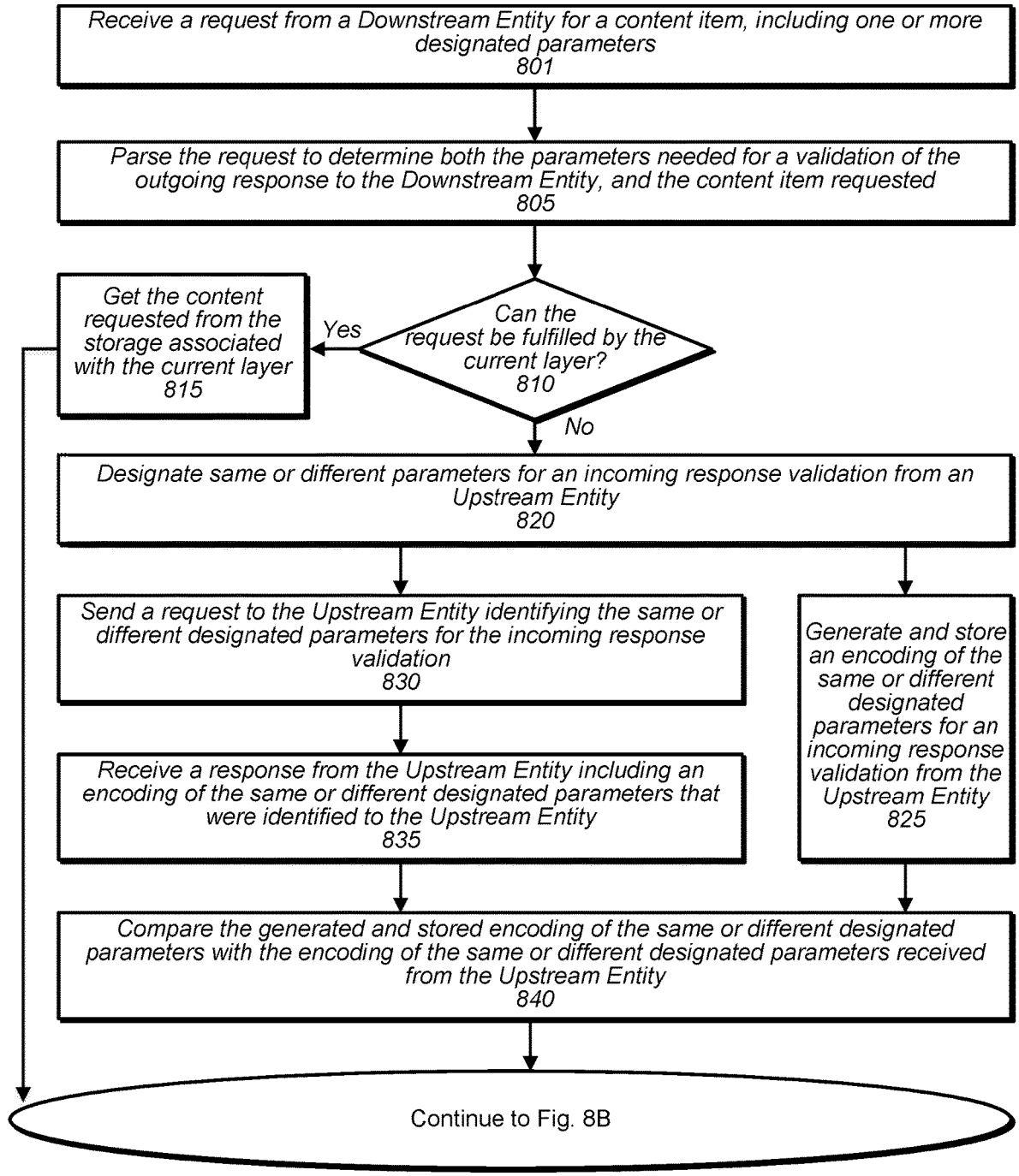
FIGS. 8A and 8B together make one combined flowchart of an illustrative method of receiving a request for a content item from a downstream entity that includes parameters for validation, generating a request for the content item that includes the same or different parameters, sending the request to an upstream entity, receiving a response from the upstream entity, potentially validating the content in the response, and responding to the request from the downstream entity using the content and an encoding of the requested parameter values, according to some embodiments.

FIG. 7 is a flowchart of an illustrative method of receiving a request for a content item from a downstream entity that includes parameters for validation, obtaining content for a response, determining the parameter values, generating an encoding of the parameter values, and sending a response back to the downstream entity, according to some embodiments. The flowchart begins at block 710 which receives a request for a content item from downstream entity, where the request identifies parameters for validation. The flowchart transitions to block 720 which obtains content for request using parameter values based on processing request. The flowchart then transitions to block 730 which determines parameter values used to obtain the content that corresponds to parameters identified in the request for validation. The flowchart then transitions to block 740 which generates an encoding of parameter values used to obtain the content that corresponds to parameters identified in the request for validation. Finally, block 750 sends the response back to the downstream entity including the content and the encoding FIGS. 8A and 8B together make one combined flowchart of an illustrative method of receiving a request for a content item from a downstream entity that includes parameters for validation, generating a request for the content item that includes the same or different parameters, sending the request to an upstream entity, receiving a response from the upstream entity, potentially validating the content in the response, and responding to the request from the downstream entity using the content and an encoding of the requested parameter values, according to some embodiments. The flowchart begins at 801 which receives a request from a Downstream Entity for a content item, including one or more designated parameters. Block 805 then parses the request to determine both the parameters needed for a validation of the outgoing response to the Downstream Entity, and the content item requested. Then block 810 determines whether the request can be fulfilled by the current layer. If the request can be fulfilled by the current layer, the current layer gets the data content requested from the storage associated with the current layer, and then transitions directly down to 865 in FIG. 8B.

If the request cannot be fulfilled by the current layer, the flowchart transitions to 820. Block 820 designates the same or different parameters for an incoming response validation from an Upstream Entity. After these parameters are designated, multiple actions happen potentially in parallel, in some embodiments. In other embodiments, they might happen sequentially, but the order of block 825 in reference to blocks 830 and 835 is not important. On one track, block 825 generates and stores an encoding of the same or different designated parameters for an incoming response validation from the Upstream Entity. On the other track, bock 830 sends a request to the Upstream Entity identifying the same or different designated parameters for the incoming response validation. At block 835, a response is then received from the Upstream Entity including an encoding of the same or different designated parameters that were identified to the Upstream Entity. After blocks 825 and 835 are completed, the flowchart transitions to block 840 which compares the generated and stored encoding of the same or different designated parameters with the encoding of the same or different designated parameters received from the Upstream Entity.

Figure 8B:
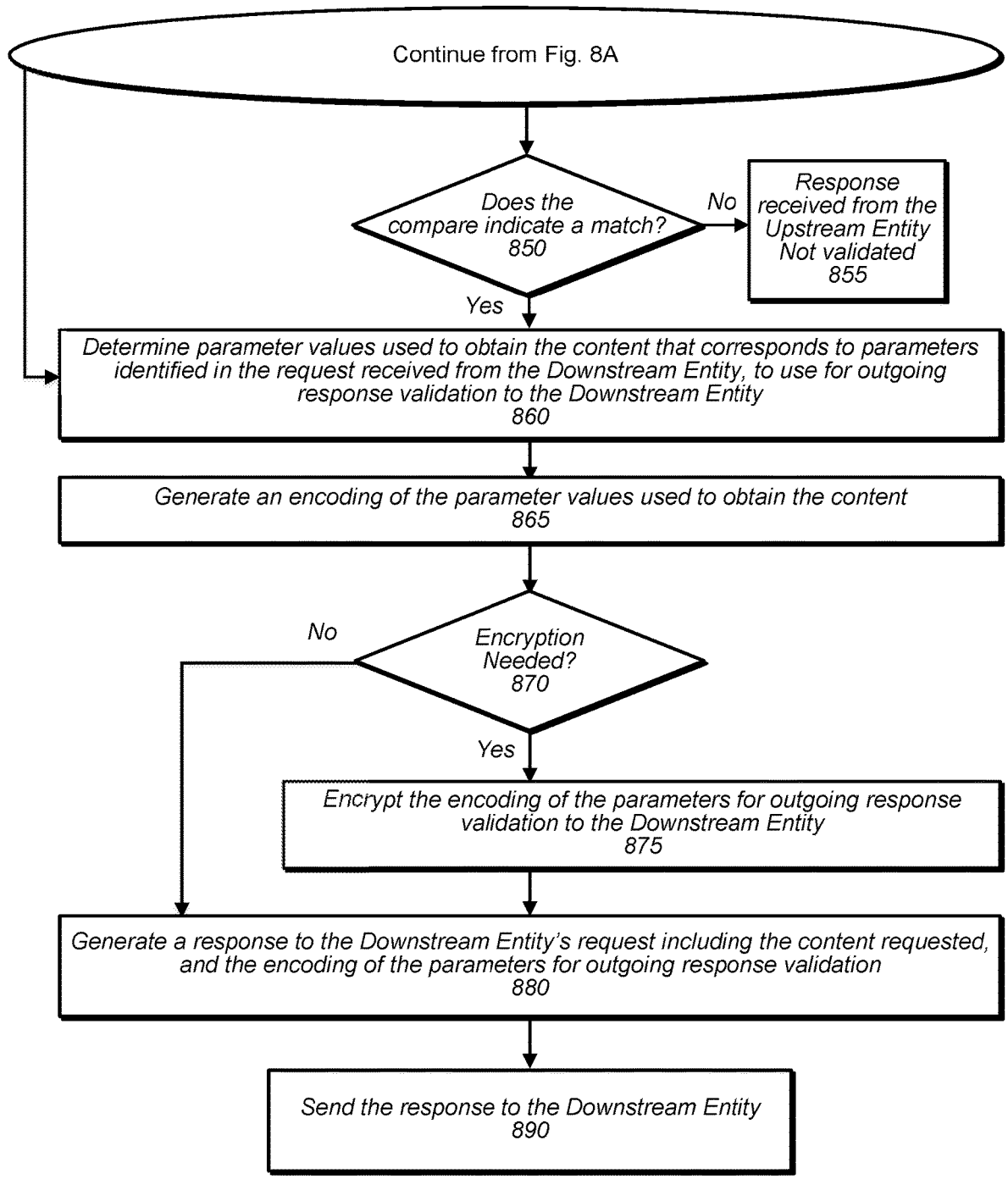

After block 840, the flowchart moves over to FIG. 8B. Block 850 determines whether the comparison that occurred in block 840 indicates a match between the generated and stored encoding of the same or different designated parameters with the encoding of the same or different designated parameters received from the Upstream Entity. If there is no match, the flowchart transitions to block 855 in which the response received from the upstream entity is not validated. When the content is not validated, this might mean that the content is discarded, in some embodiments, or it might mean that the content is further used, but the content might comprise or be associated with an indication that the data was not properly verified or validated. If the compare does indicate a match in block 850, however, then the content from the response received from the upstream entity can be used to generate a response to the downstream entity. Block 860 determines parameter values used to obtain the content that correspond to parameters identified in the request received from the downstream entity. These parameter values are determined so that they can be used for an outgoing response validation to the downstream entity. The flowchart then transitions to block 865 which generates an encoding of the parameter values used to obtain the content. The content could be content received from the upstream entity in block 835, or it could be the content retrieved from storage associated with the current layer in block 815. Those parameter values are then used for the outgoing response validation to the Downstream Entity.

The flowchart then transitions to block 870 in which it is determined whether encryption is needed. If encryption is not needed the flowchart transitions directly to block 880. If encryption is needed, or is specified by the downstream entity, then block 875 encrypts the encoding of the parameters for the outgoing response validation to the Downstream Entity. The flowchart then transitions to block 880 which generates a response to the Downstream Entity's request including the content requested, and the encoding of the parameters for outgoing response validation. Finally, the flowchart transitions to block 890 which sends the response to the downstream entity.

Illustrative System

Figure 9:
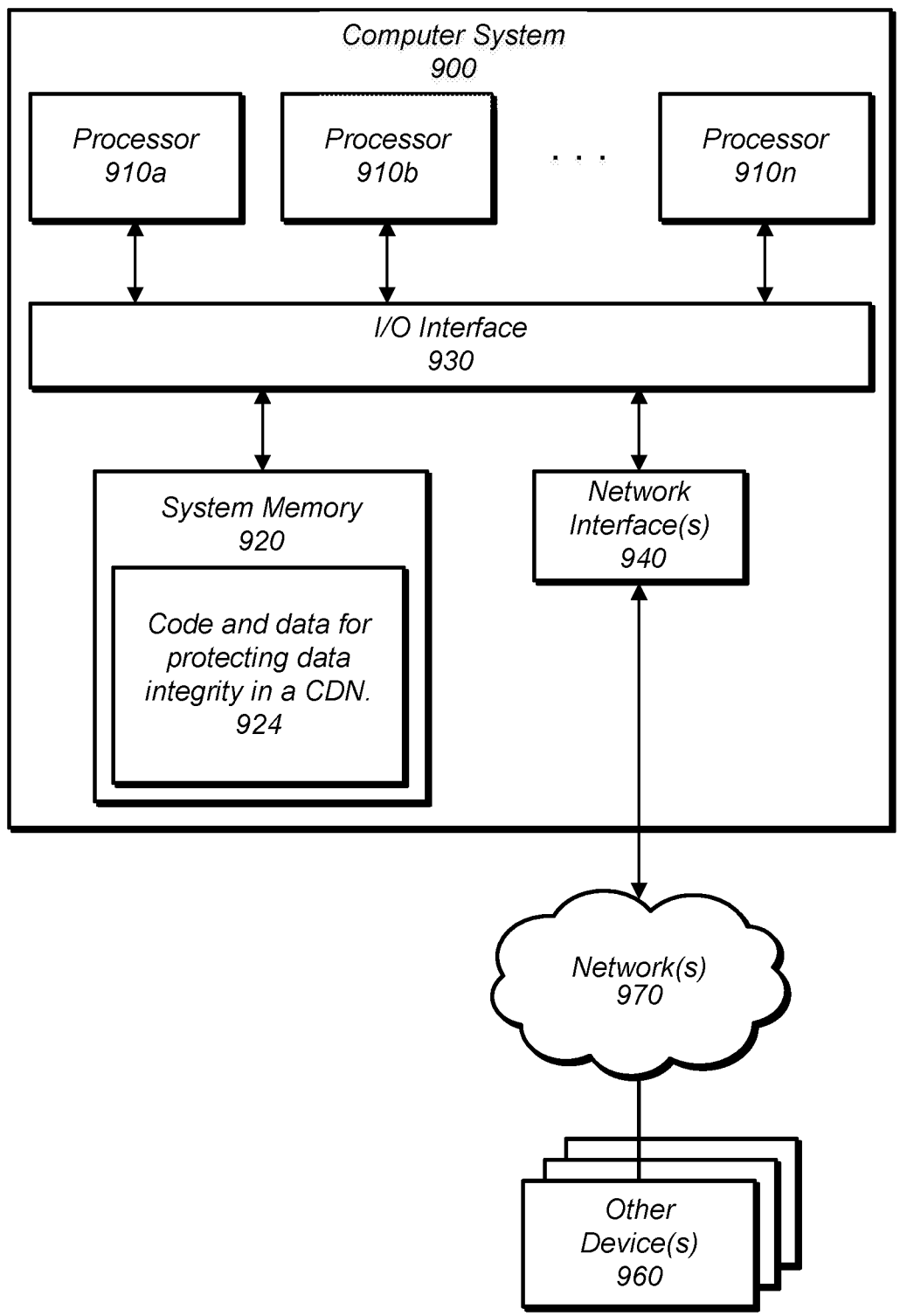
FIG. 9 is a block diagram illustrating an example computer system that may be used for protecting data integrity in a CDN, according to some embodiments.

FIG. 9 is a block diagram illustrating an example computer system that may be used for protecting data integrity in a CDN, according to some embodiments. In at least some embodiments, a computer that implements a portion or all of the apparatuses and methods for protecting data integrity in a content distribution network as described herein may include a general-purpose computer system or computing device that includes or is configured to access one or more computer-accessible media, such as computer system 900 illustrated in FIG. 9. FIG. 9 is a block diagram illustrating an example computer system that may be used for a content distribution network 100 in some embodiments. In the illustrated embodiment, computer system 900 includes one or more processors 910 coupled to a system memory 920 via an input/output (I/O) interface 930. Computer system 900 further includes a network interface 940 coupled to I/O interface 930.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for a distributed numeric sequence generator, are shown stored within system memory 920 as the code and data for protecting data integrity in a CDN 924.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 1020) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 970, such as other computer systems or devices as illustrated in FIGS. 1, 2, 3, and 4, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above for FIGS. 1 through 10 for implementing a distributed numeric sequence generator. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:
1. A system, comprising:
one or more computers of a content distribution network configured to provide content via a point of presence to clients requesting the content, wherein the content is sourced from one or more origin servers, the content distribution network comprising one or more layers for servicing content requests, wherein a given layer of the one or more layers comprises:
one or more processors and associated memory configured to implement a content request handler that is configured to:
responsive to a determination that a request for a content item received at the given layer cannot be fulfilled at the given layer:
designate one or more parameters as one or more validation parameters;
identify the designated one or more parameters as the one or more validation parameters in a request for the content item to an upstream layer; and
send the request for the content item to the upstream layer, wherein the request identifies the one or more validation parameters; and
a same or different one or more processors and associated memory configured to implement a content validation component that is configured to:
generate an encoding of one or more values of the designated one or more parameters;

receive a response to the request from the upstream layer comprising a validation encoding of the designated one or more parameters;

compare the validation encoding of the designated one or more parameters, from the response to the request received from the upstream layer, to the generated encoding; and validate, responsive to the compare indicating a match, the response to the request received from the upstream layer;

wherein the given layer of the content distribution network is further configured to, responsive to the validation of the response by the content validation component, use content obtained from the validated response to respond to the request for the content item.

2. The system of claim 1, wherein the given layer of the content distribution network further comprises a same or different one or more processors and associated memory configured to implement a content response handler that is configured to:

receive the request for the content item from a downstream entity, wherein the request identifies one or more downstream parameters to be used as one or more downstream validation parameters;

obtain content responsive to the request using one or more parameter values based on the request;

generate an encoding of one or more of the parameter values used to obtain the content that correspond to the one or more downstream validation parameters identified in the request; and send a response to the request for the content item to the downstream entity, wherein the response comprises the obtained content and the encoding of the one or more of the parameter values used to obtain the content.

3. The system of claim 2, wherein the given layer of the content distribution network is a cache layer comprising a cache content storage, wherein to obtain content responsive to the request, the content response handler is configured to use the one or more parameter values based on the request to locate the content in the cache content storage.

4. The system of claim 1, wherein the given layer of the content distribution network comprises a same or different one or more processors and associated memory configured to implement a cache layer comprising one or more storage devices configured to implement a cache content storage;

wherein the content request handler is further configured to determine that the request for the content item cannot be fulfilled at the given layer responsive to being unable to locate content for the requested content item in the cache content storage; and wherein the same or different one or more processors and associated memory of the cache layer is configured to store the content obtained from the validated response in the one or more storage devices of the cache content storage.

5. The system of claim 1, further comprising:

a same or different one or more processors and associated memory configured to implement the one or more origin servers, wherein a particular origin server of the one or more origin servers is configured to:

receive the request for the content item from the given layer of the content distribution network;

obtain content responsive to the request using one or more parameter values based on the request;

generate an encoding of one or more of the parameter values used to obtain the content that correspond to the one or more validation parameters identified in the request;

sign the encoding of one or more of the parameter values used to obtain the content with a cryptographic digital signature that identifies the particular origin server; and send a response to the request for the content item to the given layer of the content distribution network, wherein the response comprises the obtained content and the signed encoding of the one or more parameter values used to obtain the content; and wherein to validate the response to the request, the content validation component is further configured to validate the cryptographic digital signature to determine the response was received from the correct origin server.

6. A method, comprising:

designating, by a content request handler of a given layer of one or more layers of a content distribution network that provides content via a point of presence to a plurality of clients requesting the content, and responsive to a determination that a request for a content item received at the given layer cannot be fulfilled at the given layer, one or more parameters as one or more validation parameters;

identify the designated one or more parameters as the one or more validation parameters in a request for the content item to an upstream layer;

sending the request for the content item to the upstream layer, wherein the request identifies the one or more validation parameters;

generating an encoding of one or more values of the designated one or more parameters;

receiving a response to the request for the content item from the upstream layer comprising a validation encoding of the designated one or more parameters;

comparing the validation encoding of the designated one or more parameters, from the response to the request received from the upstream layer, to the generated encoding;

validating, responsive to the comparing indicating a match, the response to the request received from the upstream layer; and using, responsive to validating the response, content obtained from the validated response to respond to the request for the content item.

7. The method of claim 6 further comprising:

receiving the request for the content item from a downstream entity, wherein the request identifies one or more downstream parameters to be used as one or more downstream validation parameters;

obtaining content responsive to the request using one or more parameter values based on the request;

generating an encoding of one or more of the parameter values used to obtain the content that correspond to the one or more downstream validation parameters identified in the request; and sending a response to the request for the content item to the downstream entity, wherein the response comprises the obtained content and the encoding of the one or more of the parameter values used to obtain the content.

8. The method of claim 7, wherein the given layer of the content distribution network is a cache layer comprising a cache content storage, and wherein obtaining content responsive to the request further comprises using the one or more parameter values based on the request to locate the content in the cache content storage.

9. The method of claim 7, wherein the downstream entity is a client of the plurality of clients.

10. The method of claim 6, wherein the given layer of the content distribution network is a cache layer comprising a cache content storage, further comprising:
   determining that the request for the content item cannot be fulfilled at the given layer responsive to being unable to locate content for the requested content item in the cache content storage; and
   storing the content obtained from the validated response in the cache content storage.

11. The method of claim 6, wherein the content that the content distribution network provides is sourced from one or more origin servers, further comprising:
   receiving, by the one or more origin servers, the request for the content item from the given layer of the content distribution network;
   obtaining content responsive to the request using one or more parameter values based on the request;
   generating an encoding of one or more of the parameter values used to obtain the content that correspond to the one or more validation parameters identified in the request;
   signing the encoding of one or more of the parameter values used to obtain the content with a cryptographic digital signature that identifies the particular origin server; and
   sending a response to the request for the content item to the given layer of the content distribution network, wherein the response comprises the obtained content and the signed encoding of the one or more parameter values used to obtain the content;
   wherein validating the response to the request further comprises validating the cryptographic digital signature to determine the response was received from the correct origin server.

12. The method of claim 6, wherein the encoding of the one or more values of the designated one or more parameters and the validation encoding of the designated one or more parameters both comprise hashes of the values of the designated one or more parameters.

13. The method of claim 6, wherein the validation encoding of the designated one or more parameters from the response to the request received from the upstream layer comprises an encryption of the values of the designated one or more parameters.

14. The method of claim 6 further comprising:
   designating, by the content request handler, responsive to a determination that a second request for a second content item received at the given layer cannot be fulfilled at the given layer, one or more same or different parameters to be identified in a second request for the second content item to be made to a same or different upstream layer, as one or more validation parameters;
   sending the second request to the same or different upstream layer, wherein the second request identifies the designated one or more same or different parameters as a second set of one or more validation parameters;
   generating a second encoding of one or more values of the designated one or more same or different parameters;
   comparing a second validation encoding of the designated one or more same or different parameters, from a second response to the second request received from the same or different upstream layer, to the second generated encoding;
   failing to validate, responsive to the comparing not indicating a match, the second response received from the same or different upstream layer; and
   responding to the second request for the second content item with a response comprising content obtained from the second response received from the same or different upstream layer, and an indication of a failed validation.

15. One or more non-transitory computer-readable storage media storing program instructions, that when executed on or across one or more processors of a given layer of one or more layers of a content distribution network that provides content via a point of presence to a plurality of clients requesting the content, cause the one or more processors to:
   designate, by a content request handler of the given layer, and responsive to a determination that a request for a content item received at the given layer cannot be fulfilled at the given layer, one or more parameters as one or more validation parameters;
   identify the designated one or more parameters as the one or more validation parameters in a request for the content item to an upstream layer;
   send the request for the content item to the upstream layer, wherein the request identifies the one or more validation parameters;
   generate an encoding of one or more values of the designated one or more parameters;
   receive a response to the request for the content item from the upstream layer comprising a validation encoding of the designated one or more parameters;
   compare the validation encoding of the designated one or more parameters, from the response to the request received from the upstream layer, to the generated encoding;
   validate, responsive to the comparing indicating a match, the response to the request received from the upstream layer; and
   use, responsive to validating the response, content obtained from the validated response to respond to the request for the content item.

16. The one or more non-transitory computer-readable storage media of claim 15, wherein the program instructions cause the given layer of one or more layers of a content distribution network to further perform:
   receive the request for the content item from a downstream entity, wherein the request identifies one or more downstream parameters to be used as one or more downstream validation parameters;
   obtain content responsive to the request using one or more parameter values based on the request;
   generate an encoding of one or more of the parameter values used to obtain the content that correspond to the one or more downstream validation parameters identified in the request; and
   send a response to the request for the content item to the downstream entity, wherein the response comprises the obtained content and the encoding of the one or more of the parameter values used to obtain the content.

17. The one or more non-transitory computer-readable storage media of claim 15, wherein the given layer of the content distribution network is a cache layer comprising a cache content storage, and wherein to obtain content responsive to the request, the program instructions cause the given layer of one or more layers of a content distribution network to further perform:

use the one or more parameter values based on the request to locate the content in the cache content storage.

18. The method of claim 15, wherein the downstream entity is a client of the plurality of clients.

19. The one or more non-transitory computer-readable storage media of claim 15, wherein the given layer of the content distribution network is a cache layer comprising a cache content storage, and wherein the program instructions cause the given layer of one or more layers of a content distribution network to further perform:
    determine that the request for the content item cannot be fulfilled at the given layer responsive to being unable to locate content for the requested content item in the cache content storage; and
    store the content obtained from the validated response in the cache content storage.

20. The one or more non-transitory computer-readable storage media of claim 15, wherein the encoding of the designated one or more parameters and the validation encoding of the designated one or more parameters both comprise hashes of the designated one or more parameters.

21. The one or more non-transitory computer-readable storage media of claim 20, wherein the validation encoding of the designated one or more parameters from the response to the request received from the upstream layer comprises an encryption of the hash of the designated one or more parameters.

22. The one or more non-transitory computer-readable storage media of claim 15, wherein the program instructions cause the given layer of one or more layers of a content distribution network to further perform:
    designate, by the content request handler, responsive to a determination that a second request for a second content item received at the given layer cannot be fulfilled at the given layer, one or more same or different parameters to be identified in a second request for the second content item to be made to a same or different upstream layer, as one or more validation parameters;
    send the second request to the same or different upstream layer, wherein the second request identifies the designated one or more same or different parameters as a second set of one or more validation parameters;
    generate a second encoding of one or more values of the designated one or more same or different parameters;
    compare a second validation encoding of the designated one or more same or different parameters, from a second response to the second request received from the same or different upstream layer, to the second generated encoding;
    fail to validate, responsive to the comparing not indicating a match, the second response received from the same or different upstream layer; and
    respond to the second request for the second content item with a response comprising content obtained from the second response received from the same or different upstream layer, and an indication of a failed validation.

* * * * *